(12) United States Patent
Vuillermet et al.

(10) Patent No.: US 10,385,964 B2
(45) Date of Patent: Aug. 20, 2019

(54) ENHANCED NEUTRAL GEAR SENSOR

(71) Applicant: Allegro MicroSystems, LLC, Manchester, NH (US)

(72) Inventors: Yannick Vuillermet, Voglans (FR); Cédric Gillet, Annecy (FR); Andrea Foletto, Annecy le Vieux (FR); Andreas P. Friedrich, Metz-Tessy (FR)

(73) Assignee: Allegro MicroSystems, LLC, Manchester, NH (US)

(*) Notice: Subject to any disclaimer, the term of this patent is extended or adjusted under 35 U.S.C. 154(b) by 190 days.

(21) Appl. No.: 15/176,524

(22) Filed: Jun. 8, 2016

(65) Prior Publication Data
US 2017/0356763 A1 Dec. 14, 2017

(51) Int. Cl.
*G01P 3/44* (2006.01)
*G01P 21/00* (2006.01)
(Continued)

(52) U.S. Cl.
CPC ........... *F16H 59/044* (2013.01); *G01D 5/147* (2013.01)

(58) Field of Classification Search
CPC .. G01P 3/44; G01P 21/00; G01P 3/487; G01P 3/488; G01P 13/045; F02D 41/22;
(Continued)

(56) References Cited

U.S. PATENT DOCUMENTS 4,668,914 A 5/1987 Kersten et al.
4,761,569 A 8/1988 Higgs
(Continued)

FOREIGN PATENT DOCUMENTS

DE 10 2005 014 509 B4 10/2006
DE 10 2006 037 226 A2 2/2008
(Continued)

OTHER PUBLICATIONS

U.S. Appl. No. 15/012,142, filed Feb. 1, 2016, Alpago, et al.
(Continued)

*Primary Examiner* — Neel D Shah
*Assistant Examiner* — Brent J Andrews
(74) *Attorney, Agent, or Firm* — Daly, Crowley, Mofford & Durkee, LLP

(57) ABSTRACT

Embodiments provide systems and methods for determining a position of a gear shift lever of a vehicle. A ferromagnetic target object having selected characteristics influences a magnetic field generated by a back bias magnet. A magnetic field sensor includes magnetic field sensing elements disposed proximate to the target object. Each magnetic field sensing element generates an electronic signal in response to sensed magnetic fields. The gear shift lever moves among a plurality of gears of the vehicle. The magnetic field sensor selects a set of the magnetic field sensing elements to determine a magnetic field difference based on a difference of amplitudes between the electronic signals that is related to a current position of the gear shift lever. Characteristics of the target object enable the magnetic field sensor to detect the position of the gear shift lever. The characteristics include edges proximate to a perimeter of the target object.

37 Claims, 11 Drawing Sheets

(51) Int. Cl.
*G01P 3/487* (2006.01)
*G01P 3/488* (2006.01)
*G01D 18/00* (2006.01)
*G01D 5/14* (2006.01)
*F02D 41/22* (2006.01)
*F02D 41/00* (2006.01)
*F16H 59/04* (2006.01)

(58) Field of Classification Search
CPC .... F02D 41/00; F02D 41/222; F02D 41/0097; G01D 18/00; G01D 5/14; G01D 5/2451; G01D 5/24466
See application file for complete search history.

(56) References Cited

U.S. PATENT DOCUMENTS

| | | |
|---|---|---|
| 4,829,352 A | 5/1989 | Popovic et al. |
| 5,343,145 A | 8/1994 | Wellman et al. |
| 5,541,506 A | 7/1996 | Kawakita et al. |
| 5,572,058 A | 11/1996 | Biard |
| 5,612,618 A | 3/1997 | Arakawa |
| 5,619,137 A | 4/1997 | Vig et al. |
| 5,621,319 A | 4/1997 | Bilotti et al. |
| 5,657,189 A | 8/1997 | Sandhu |
| 5,694,038 A | 12/1997 | Moody et al. |
| 5,729,130 A | 3/1998 | Moody et al. |
| 5,831,513 A | 11/1998 | Lue |
| 5,844,411 A | 12/1998 | Vogt |
| 5,942,895 A | 8/1999 | Popovic et al. |
| 6,064,199 A | 5/2000 | Walter et al. |
| 6,064,202 A | 5/2000 | Steiner et al. |
| 6,091,239 A | 7/2000 | Vig et al. |
| 6,100,680 A | 8/2000 | Vig et al. |
| 6,166,535 A | 12/2000 | Irle et al. |
| 6,232,768 B1 | 5/2001 | Moody et al. |
| 6,236,199 B1 | 5/2001 | Irle et al. |
| 6,265,864 B1 | 7/2001 | De Winter et al. |
| 6,288,533 B1 | 9/2001 | Haeberli et al. |
| 6,297,627 B1 | 10/2001 | Towne et al. |
| 6,339,325 B1 | 1/2002 | Oda et al. |
| 6,356,741 B1 | 3/2002 | Bilotti et al. |
| 6,525,531 B2 | 2/2003 | Forrest et al. |
| 6,542,068 B1 | 4/2003 | Drapp et al. |
| 6,545,462 B2 | 4/2003 | Schott et al. |
| 6,605,939 B1 | 8/2003 | Jansseune et al. |
| 6,622,012 B2 | 9/2003 | Bilotti et al. |
| 6,768,301 B1 | 7/2004 | Hohe et al. |
| 6,969,988 B2 | 11/2005 | Kakuta et al. |
| 7,030,606 B2 | 4/2006 | Kato et al. |
| 7,038,448 B2 | 5/2006 | Schott et al. |
| 7,085,119 B2 | 8/2006 | Bilotti et al. |
| 7,119,538 B2 | 10/2006 | Blossfeld |
| 7,159,556 B2 | 1/2007 | Yoshihara |
| 7,235,968 B2 | 6/2007 | Popovic et al. |
| 7,259,556 B2 | 8/2007 | Popovic et al. |
| 7,307,824 B2 | 12/2007 | Bilotti et al. |
| 7,319,319 B2 | 1/2008 | Jones et al. |
| 7,362,094 B2 | 4/2008 | Voisine et al. |
| 7,648,153 B2 | 1/2010 | Metternich et al. |
| 7,714,570 B2 | 5/2010 | Thomas et al. |
| 7,746,065 B2 | 6/2010 | Pastre et al. |
| 7,759,929 B2 | 7/2010 | Forsyth |
| 7,829,805 B2 | 11/2010 | Ersoy et al. |
| 7,872,322 B2 | 1/2011 | Schott et al. |
| 7,911,203 B2 | 3/2011 | Thomas et al. |
| 7,965,076 B2 | 6/2011 | Schott |
| 7,994,774 B2 | 8/2011 | Thomas et al. |
| 8,350,663 B1 | 1/2013 | Michael |
| 8,729,892 B2 | 5/2014 | Friedrich |
| 8,739,647 B2 | 6/2014 | Benson et al. |
| 8,746,104 B2 | 6/2014 | Benson et al. |
| 8,793,085 B2 | 7/2014 | Donovan et al. |
| 9,046,383 B2 | 6/2015 | Friedrich et al. |
| 9,605,975 B2 | 3/2017 | Foletto et al. |
| 2004/0164731 A1 | 8/2004 | Moreno |
| 2005/0040814 A1 | 2/2005 | Vig et al. |
| 2005/0126322 A1 | 6/2005 | Kozaki et al. |
| 2005/0258820 A1 | 11/2005 | Forster |
| 2005/0286155 A1 | 12/2005 | Tagami et al. |
| 2006/0011999 A1 | 1/2006 | Schott et al. |
| 2006/0145450 A1 | 7/2006 | Metternich et al. |
| 2008/0078604 A1 | 4/2008 | Ersoy et al. |
| 2009/0121707 A1 | 5/2009 | Schott |
| 2009/0174395 A1 | 7/2009 | Thomas et al. |
| 2009/0320633 A1 | 12/2009 | Knysch |
| 2010/0156397 A1 | 6/2010 | Yabusaki et al. |
| 2010/0164491 A1 | 7/2010 | Kejik et al. |
| 2011/0148398 A1 | 6/2011 | Yang et al. |
| 2011/0248708 A1 | 10/2011 | Thomas et al. |
| 2011/0267040 A1 | 11/2011 | Frachon |
| 2012/0152049 A1 | 6/2012 | Benson et al. |
| 2012/0217955 A1 | 8/2012 | Petrie |
| 2012/0249133 A1* | 10/2012 | Friedrich ........... G01R 33/0005 324/247 |
| 2013/0046488 A1 | 2/2013 | Donovan et al. |
| 2013/0134965 A1* | 5/2013 | Friedrich ........... G01R 33/0023 324/202 |
| 2013/0179115 A1* | 7/2013 | Friedrich ................. F16H 59/70 702/150 |
| 2014/0062463 A1* | 3/2014 | Foletto .................. G01D 5/145 324/207.13 |
| 2015/0176962 A1 | 6/2015 | Kerdraon et al. |

FOREIGN PATENT DOCUMENTS

| | | |
|---|---|---|
| DE | 10 2007 050 531 A | 4/2009 |
| DE | 10 2007 050531 A1 | 4/2009 |
| EP | 0 631 416 B1 | 12/1994 |
| EP | 0 875 733 B1 | 11/1998 |
| EP | 0 916 074 B1 | 5/1999 |
| EP | 09 90821 A1 | 4/2000 |
| EP | 1 450 136 A2 | 8/2004 |
| EP | 2 000 814 A2 | 12/2008 |
| FR | 2 954 824 | 6/2011 |
| JP | 58-055688 A | 4/1983 |
| JP | 2003-042709 | 2/2003 |
| JP | 2005-241269 | 9/2005 |
| JP | 2010-014607 | 1/2010 |
| JP | 2010-078366 | 4/2010 |
| WO | WO 1998/010302 | 3/1998 |
| WO | WO 1998/054547 | 12/1998 |
| WO | WO 2000/002266 | 1/2000 |
| WO | WO 2003/036732 A2 | 5/2003 |
| WO | WO 2004/025742 A1 | 3/2004 |
| WO | WO 2006/056829 A1 | 6/2006 |
| WO | WO 2006/074989 A2 | 7/2006 |
| WO | WO 2008 145662 A1 | 12/2008 |
| WO | WO 2009/052976 | 4/2009 |
| WO | WO 2009/124969 A1 | 10/2009 |

OTHER PUBLICATIONS

U.S. Appl. No. 15/012,131, filed Feb. 1, 2016, Alpago, et al.
U.S. Appl. No. 15/012,125, filed Feb. 1, 2016, Alpago, et al.
U.S. Appl. No. 15/180,199, filed Jun. 13, 2016, Romero.
Friedrich et al.; "Magnetic Field Sensing Element Combining a Circular Vertical Hall Magnetic Field Sensing Element with a Planar Hall Element;" U.S. Appl. No. 13/226,694, filed Sep. 7, 2011.
Friedrich; "Differential Magnetic Field Sensor Structure for Orientation Independent Measurement;" U.S. Appl. No. 13/078,200, filed Apr. 1, 2011; 66 pages.
PCT International Preliminary Report on Patentability with Written Opinion for PCT/US2012/068925 dated Jul. 24, 2014 12 pages.
Notice of Allowance dated Feb. 10, 2015; for U.S. Appl. No. 13/484,316; 9 pages.
Non-Final Office Action dated Oct. 16, 2014; for U.S. Appl. No. 13/484,316; 29 pages.
PCT Invitation to Pay Additional Fees and Partial Search Report of the ISA; dated Jul. 8, 2013; for PCT Pat. App. No. PCT/US2012/068925; 6 pages.

(56) References Cited

OTHER PUBLICATIONS

European Response Official Communication under Rule 161(1) and 162 dated Feb. 9, 2015; for European Pat. App. No. 12809923.1; 20 pages.
Response filed on Jan. 6, 2015 to the Non-Final Office Action dated Oct. 16, 2014; for U.S. Appl. No. 13/484,316; 23 pages.
PCT Search Report and Written Opinion of the ISA dated Nov. 11, 2013; for PCT Pat. App. No. PCT/US2012/268925; 17 pages.
Allegro Microsystems, Inc.; "A1351 Data Sheet: High Precision Linear Hall Effect Sensor with a Push/Pull, Pulse Width Modulated Output;" published Mar. 7, 2008; pp. 1-23; 23 pages.
Allegro Microsystems, Inc.; "High Precision 2-Wire Linear Hall Effect Sensor IC with a Pulse Width Modulated Output;" A1354; pp. 1-22; 22 pages.
Allegro Microsystems, Inc.; "High Precision Linear Hall-Effect Sensor with an Open Drain Pulse Width Modulated Output;" A1356; pp. 1-20; 20 pages.
Allegro Microsystems, Inc.; "Low-Noise Programmable Linear Hall Effect Sensor ICs with Adjustable Bandwidth (50 kHz Maximum) and Analog Output;" A1360, A1361 and A1362; pp. 1-25; 25 pages.
Baschirotto et al.; "Development and Analysis of a PCB Vector 2-D Magnetic Field Sensor System for Electronic Compasses;" IEEE Sensors Journal, vol. 6, No. 2; Apr. 2006; pp. 365-371; 7 pages.
Kejik, et al.; "Purley CMOS Angular Position Sensor Based on a New Hall Microchip;" 34$^{th}$ Annual Conference of IEEE Industriai Electronics; IECON; Nov. 10-13, 2008; pp. 1777-1781; 5 pages.
Kejik,.et al.; "Ultra Low-Power Angular Position Sensor for High-Speed Portable Applications;" 2009 IEEE Sensors Conference; Oct. 25-28, 2009; pp. 173-176; 4 pages.
Raymond, et al.; "True 2D CMOS Integrated Hall Sensor;" 2007 IEEE Sensors Conference; Oct. 28-31, 2007; pp. 860-863; 4 pages.
Gerhauser; "Intelligente 3D-Magnetfeld Snesorik;" Fraunhofer-Institut for Integrierte Schaltungen IIS; www.iis.fraunhofer.de/asic/analog; Oct. 2009; 2 pages.
Melexis Microelectronic Integrated Systems; MLX90333; "Triaxis 3D-Joystick Position Sensor;" Data Sheet; Mar. 2009; 43 pages.
MEMSIC Corporation; AN-00MM-004; "Electronic Tilt Compensation;" Mar. 2008; 5 pages.
MEMSIC Corporation; AN-00MM-003; "Magnetic Sensor Calibration;" Mar. 2008; 5 pages.
MEMSIC Corporation; AN-00MM-002; "Magnetometer Soldering Methodology;" Jun. 2008; 2 pages.
MEMSIC Corporation; AN-00MM-001; "Magnetometer Fundamentals;" Jun. 2008; 6 pages.
MEMSIC Corporation; AN-00MM-005; "Magnetic Sensor Placement Guidelines;" Oct. 2008; 2 pages.
MEMSIC Corporation; MMC312xMQ; "Tri-axis Magnetic Sensor, with I$^2$C Interface;" Aug. 14, 2008; 9 pages.
MEMSIC Corporation; MMC314xMS; "Ultra Small 3-axis Magnetic Sensor, with I$^2$C Interface;" Mar. 31, 2010; 8 pages.
Micronas GmbH; "HAL® 3625 Programmable Direct Angle Sensor;" Product Information; Sep. 2009; 2 pages.
Banjevic; "High Bandwidth CMOS Magnetic Sensors Based on the Miniaturized Circular Vertical Hall Device;" Sep. 2011; 153 pages.
Drljaca, et al.; "Nonlinear Effects in Magnetic Angular Position Sensor With Integrated Flux Concentrator;" Proc. 23$^{rd}$ International Conference on Microelectronics (MIEL 2002); vol. 1, NIS; Yugoslavia; May 12-15, 2002; pp. 223-226; 4 pages.
Melexis MLX 90324; ""Under-the-Hood" Triaxis Rotary Position feat. SENT Protocol;" 3901090324 Data Sheet; Dec. 2008; 40 pages.
Petrie; "Circular Vertical Hall Magnetic Field Sensing Element and Method with a Plurality of Continuous Output Signals;" U.S. Appl. No. 13/035,243, filed Feb. 25, 2011; 56 pages.
Meher et al.; "50 Years of CORDIC: Algorithm, Architectures, and Applications", IEEE Transactions on Circuits and Systems; vol. 56, No. 9. Sep. 2009; p. 1893-1907 (15 pages).
Andraka, Ray: "A survey of CORDIC algorithms for FPGA based computers"; FPGA-1998, Montgomery, CA; (10 pages).

Granig et al.; "Integrated Giant Magnetic Resistance based Angle Sensor", IEEE Sensors 2006, EXCO, Daegu, Korea; Oct. 22-25, 2006; pp. 542-545 (4 pages).
Ausserlechner, Udo: "The Optimum Layout for Giant Magneto-Resistive Angle Sensors", IEEE Sensors Journal, vol. 10, No. 10, Oct. 2010; pp. 1571-1582 (12 pages).
Communication pursuant to Article 94(3) EPC dated Dec. 13, 2017 for EP Pat. Appl. No. 12809923.1-1568; 7 pages.
Allegro Microsystems, Inc.; "A1140/41/42/43 Data Sheet: Sensitive Two-Wire Chopper-Stabilized Unipolar Hall-Effect Switches;" published Sep. 9, 2004; pp. 1-11; 11 pages.
Allegro Microsystems, Inc.; "A1174 Data Sheet: Ultrasensitive Hall Effect Latch with Internally or Externally Controlled Sample and Sleep Periods for Track Ball and Scroll Wheel Applications;" published Jul. 25, 2008; pp. 1-13; 13 pages.
Allegro Microsystems, Inc.; "A1230 Data Sheet: Ultra-Sensitive Dual-Channel Quadrature Hall-Effect Bipolar Switch;" published Mar. 26, 2010; 16 sheets.
Allegro Microsystems, Inc.; "A1360, A1361 and A1362 Data Sheet: Low-Noise Programmable Linear Hall Effect Sensors with Adjustable Bandwidth (50 kHz Maximum) and Analog Output;" published Mar. 18, 2008; pp. 1-25; 25 pages.
Allegro Microsystems, Inc.; "A3212 Data Sheet: Micropower, Ultra-Sensitive Hall-Effect Switch;" published Sep. 22, 2004; pp. 1-12; 12 pages.
Allegro Microsystems, Inc.; "ATS675LSE Data Sheet: Self-calibrating TPOS Speed Sensor Optimized for Automotive Cam Sensing Applications;" published Jul. 11, 2008; pp. 1-13; 13 pages.
Allegro Microsystems, Inc.; "27701-AN Data Sheet: Hall-Effect IC Applications Guide;" Application Information, Rev. 2; http://www.allegromicro.com/en/products/design/hall-effect-sensor-ic-applications-guides/AN27701.pdf; downloaded Sep. 29, 2010; pp. 1-40; 40 pages.
Allegro Microsystems, Inc.; "3235 Data Sheet 27633A, Dual-Output Hall-Effect Switch;" http://www.datasheetcatalog.org/datasheets/90/205047_DS.pdf; downloaded Sep. 29, 2010; 6 sheets.
Allegro Microsystems, Inc.: "A3425 Data Sheet: Dual, Chopper-Stabilized, Ultra-Sensitive Bipolar Hall-Effect Switch;" published Jun. 28, 2002; pp. 1-10; 10 pages.
Atherton et al.; "Sensor Signal Conditioning—an IC Designer's Perspective;" IEEE Electro International; Apr. 26-28, 1991; pp. 129-134; 6 pages.
Austria Microsystems; "AS5040 datasheet; 10-Bit Programmable Magnetic Rotary Encoder;" Revision 1.1; Jan. 2004; pp. 1-20; 20 pages.
Banjevic et al; "2D CMOS Integrated Magnetometer Based on the Miniaturized Circular Vertical Hall Device;" International Solid-State Sensors, Actuators and Microsystems Conference; Transducers; Jun. 21-25, 2009; pp. 877-850 ; 4 pages.
Blanchard et al.; "Cylindrical Hall Device;" International Electron Devices Meeting; Dec. 8-11, 1996; pp. 541-544; 4 pages.
Burger et al.; "New fully integrated 3-D silicon Hall sensor for precise angular-position measurements;" Sensors and Actuators, A 67; May 1998; pp. 72-76; 5 pages.
Dwyer; Allegro Microsystems, Inc.; "AN296061 Data Sheet: Ring Magnet Speed Sensing for Electronic Power Steering;" published Jul. 21, 2009; pp. 1-4.
Freitas et al,: "Giant magnetoresistive sensors for rotational speed control;" Jorunal of Applied Physics, vol. 85, No. 8; Apr. 15, 1999; pp. 5459-5461; 3 pages.
Gilbert; "Technical Advances in Hall-Effect Sensing;" Allegro Microsystems, Inc. Product Description; May 10, 2008; 7 sheets.
Häberli et al.; "Contactless Angle Measurements by CMOS Magnetic Sensor with on Chip Read-Out Circuit;" The 8$^{th}$ International Conference on Solid-State Sensors and Actuators and Eurosensors IX; Jan. 25-29, 1995; pp. 134-137; 4 pages.
Häberli et al.; "Two-Dimensional Magnetic Microsensor with On-Chip Signal Processing for Contactless Angle Measurement;" IEEE Journal of Solid-State Circuits, vol. 31, No. 12; Dec. 1996; pp. 1902-1907; 6 pages.
Hiligsmann et al.; "Monolithic 360 Degrees Rotary Position Sensor IC;" 2004 IEEE Proceedings of Sensors, vol. 3; Oct. 24-27, 2004; pp. 1137-1142; 6 pages.

(56) References Cited

OTHER PUBLICATIONS

Kejik et al.; "Circular Hall Transducer for Angular Position Sensing;" International Solid-State Sensors, Actuators and Microsystems Conference; Transducers; Jun. 2007; pp. 2593-2596; 4 pages.
Lou Law; "Angle Position Sensing with 2-Axis Hall ICs;" Sensors Magazine, vol. 20, No. 3; Mar. 2003; 7 sheets.
Masson et al.; "Multiturn and high precision through-shaft magnetic sensors;" Sensor + Text Conference; Proceedings II; May 2009; pp. 41-46; 6 pages.
Metz et al.; "Contactless Angle Measurement Using Four Hall Devices on Single Chip;"; International Conference on Solid State Sensors and Actuators; Transducers; vol. 1; Jun. 16-19, 1997; pp. 385-388; 4 pages.
Munter; "A Low-offset Spinning-current Hall Plate;" Sensors and Actuators, vol. A21-A23; Jan. 1990; pp. 743-746; 4 pages.
novotechnik Siedle Group; "How New Angular Positioning Sensor Technology Opens a Broad Range of New Applications;" Vert-X Technology; Dec. 2001; pp. 1-5.
Paranjape et al.; "A CMOS-compatible 2-D vertical Hall magnetic-field sensor using active carrier confinement and post-process micromachining;" The $8^{th}$ International Conference on Solid-State Sensors and Acutators, Physical vol. 53, Issues 1-3; May 1996; pp. 278-283; 6 pages.
Petoussis et al.; "A Novel Hall Effect Sensor Using Elaborate Offset Cancellation Method;" Sensors & Transducers Journal, vol. 100, Issue 1; Jan. 2009; pp. 85-91; 7 pages.
Popovic; "Not-plate-like Hall magnetic sensors and their applications;" Sensors and Actuators A: Physical, vol. 85, Issues 1-3; Aug. 2000; pp. 9-17; 9 pages.
Roumenin et al.; "Vertical Hall Effect Devices in the Basis of Smart Silicon Sensors;" IEEE Workshop on Intelligent Data Acquisition and Advanced Computing Systems: Technology and Applications; Sep. 5-7, 2005; pp. 55-58; 4 pages.
Roumenin; "Magnetic sensors continue to advance towards perfection;" Sensors and Actuators A: Physical, vol. 46-47, Issues 1-3, Jan.-Feb. 1995; pp. 273-279; 7 pages.
Schneider et al.; "Temperature Callbration of CMOS Magnetic Vector Probe for Contactless Angle Measurement System;" International Electron Devices Meeting; Dec. 8-11, 1996; pp. 533-536; 4 pages.
SENSIMA technology sa; "CVHD: a new concept of Angular Position Sensor;" Slide Presentation for Allegro Microsystems; Mar. 2009; 17 sheets.
Sentron; AN-101; "Angular position sensing with 2-Axis Hall IC 2SA-10;" Feb. 12, 2004; http://www.diegm.uniud.it/petrella/Azionamenti%20Elettrici%20ll/Sensori%20e%20trasduttori/Data%20Sheet%20-%202SA-10.pdf; pp. 1-7.
van der Meer; et al; "CMOS quad spinning-current Hall-sensor system for compass application;" IEEE Proceedings of Sensors, vol. 3; Oct. 24-27, 2004; pp. 1434-1437; 4 pages.
Vogelgesang et al.; Robert Bosch GmbH; "GMR sensors in automotive application;" CS-SNS/ECS Slides Presentation; Mar. 2, 2005; 16 sheets.
Volder; "The CORDIC Trigonometric Computing Technique;" The Institute of Radio Engineers, Inc.; IRE Transactions on Electronic Computers, vol. EC, Issue 3; Sep. 1959; pp. 226-230; 5 pages.
Response to Official Communication filed on Apr. 23, 2018 for EP Pat. Appl. No. 12809923.1; 3 pages.
Tracked Amended Claims filed on Apr. 23, 2018 for Application No. EP 12809923.1; 7 pages.
EP Communication pursuant to Article 94(3) EPC for EP Pat. Appl. No. 12809923.1 dated Jul. 25, 2018; 6 pages.
DCMD Instruction Letter dated Sep. 17, 2018 for EP Pat. Appl. No. 12809923.1; 2 pages.
DCMD Instruction Letter dated Sep. 18, 2018 for EP Pat. Appl. No. 12809923.1; 2 pages.
A.A. Thornton Letter dated Feb. 4, 2019 in response to Official Communication dated Jul. 25, 2018 for EP Pat. Appl. No. 12809923.1; 3 pages.
Tracked Amended Claims filed Feb. 4, 2019 for EP Pat. Appl. No. 12800923.1; 7 pages.

\* cited by examiner

ENHANCED NEUTRAL GEAR SENSOR

CROSS-REFERENCE TO RELATED APPLICATIONS

None.

STATEMENT REGARDING FEDERALLY SPONSORED RESEARCH OR DEVELOPMENT

None.

BACKGROUND

Magnetic field sensors generally include a magnetic field sensing element and other electronic components. Magnetic field sensors provide an electrical signal representative of a magnetic field sensed by the magnetic field sensing element. Various types of magnetic field sensing elements are known, including Hall Effect elements and magnetoresistance elements.

Magnetic field sensors provide information about a sensed ferromagnetic object by sensing fluctuations of a sensed magnetic field. Some magnetic field sensors sense a magnetic field associated with a magnet as an object moves within a magnetic field generated by the magnet. In the presence of a moving ferromagnetic object, the magnetic field signal sensed by the magnetic field sensor varies in accordance with a shape or profile of the moving ferromagnetic object (a "target object").

In automotive applications, a typical magnetic field sensor might determine the position of a target object, for example, the position of a gear shift lever in an automotive transmission. Such systems might beneficially sense a neutral position of a gear shift lever used in a vehicle transmission. For example, stop-start systems reduce fuel consumption and emissions by turning off a vehicle's engine when the vehicle is stopped. Using a neutral gear sensor to sense the neutral position, an engine control unit (ECU) might turn off the engine to reduce fuel consumption when the vehicle is stopped, for example, if a gear shift level is in a neutral position and the clutch is engaged (e.g., the clutch pedal is not pushed). Thereafter, when the clutch is disengaged (e.g., the clutch pedal is pushed to select a gear), the engine control unit starts the engine.

Some current neutral gear sensors employ a single Hall plate, a zero Gauss magnet (i.e., a magnet with an area proximate to the magnet at which the magnetic field is zero) and a ferromagnetic target object. The target object moves in a rotation and a translation with respect to the neutral gear sensor. The air gap between the target and the sensor typically is unchanged along the translation, but varies with the target rotation (e.g., the air gap between the ferromagnetic target object and the sensor changes with the rotation of the target object). This air gap variation corresponds to a variation of the magnetic field measured by the sensor, which can, in turn, be used to determine the gear shift lever position.

However, current neutral gear sensors can be sensitive to external magnetic fields and magnetic field perturbations, decreasing measurement accuracy. Further, since the measurement is unipolar (e.g., the sensed magnetic field is in the same direction regardless of target position), the measurement has high sensitivity to air gap variation (e.g., due to mounting and orientation in different vehicles, manufacturing tolerances, etc.). Conventional systems can also be sensitive to magnetic field strength drift over temperature variations. Consequently, some magnetic field sensors employ continuous time calibration to maintain accurate detection of the neutral position, but such calibration increases system cost and complexity and, in some instances, eliminates the ability to correctly detect additional gear shift lever position(s) (e.g., reverse, etc.). Further, zero Gauss magnets, can increase the overall system cost.

Therefore, it is desirable to provide a system that senses the neutral position as well as other positions of the gear shift lever without requiring continuous calibration and expensive magnetic components.

SUMMARY

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

In one aspect, a system for determining a position of a gear shift lever of a vehicle is provided. A ferromagnetic target object having selected characteristics influences a magnetic field generated by a back bias magnet. A magnetic field sensor includes a plurality of magnetic field sensing elements disposed proximate to a major ferromagnetic surface of the ferromagnetic target object. Each of the magnetic field sensing elements generate a respective electronic signal in response to respective sensed magnetic fields. A selected one of the magnetic field sensor or the ferromagnetic target object is stationary with respect to the gear shift lever and the other is coupled to the gear shift lever. The gear shift lever moves to select from among a plurality of gears of the vehicle. The magnetic field sensor selects a set of the plurality of magnetic field sensing elements to determine a magnetic field difference based on a difference of amplitudes between the electronic signals generated by the selected set of the plurality of magnetic field sensing elements. The difference is related to a relative position of the ferromagnetic target object and the magnetic field sensor. A current position of the gear shift lever is determined based upon the magnetic field difference. The selected characteristics of the ferromagnetic target object enable the magnetic field sensor to detect the plurality of positions of the gear shift lever. The ferromagnetic object includes a perimeter around the major ferromagnetic surface, and one of the selected characteristics of the ferromagnetic target object includes a respective one of a plurality of edges proximate to the perimeter.

In an embodiment, the selected characteristics of the ferromagnetic target object include a selected shape of the ferromagnetic target object. The selected shape includes a plurality of features, different ones of the plurality of features corresponding to different ones of the plurality of gears and disposed at different respective positions on the ferromagnetic target such that the magnetic field sensor is proximate to different ones of the plurality of features and distal from other ones of the plurality of features when the gear shift lever is in each to different positions. The sensed magnetic fields have different values when the gear shift lever is in each position. In an embodiment, at least one of the features includes a ledge projecting above the major ferromagnetic surface of the ferromagnetic target object. In an embodiment, at least one of the features includes a notch removed from a major surface of the ferromagnetic target object. In an embodiment, at least one of the features includes a first radius of a curve of at least a first section of the ferromagnetic target about an axis. In an embodiment, at least one of the plurality of features includes a second radius of a curve of at least a second section of the ferromagnetic target about an axis. In an embodiment, at least one of the plurality of features includes a depression into the major ferromagnetic surface of the ferromagnetic target object. In an embodiment, the features are selected to magnetically interact in different ways with each of the plurality of magnetic field sensing elements when the gear shift lever is in each position. In an embodiment, the at least one magnetic field sensor has different relative distances to the plurality of features when the gear shift lever is moved to positions associated with different respective gears.

In an embodiment, the magnetic field sensor selects the set of the plurality of magnetic field sensing elements based upon a relative distance between each of the plurality of magnetic field sensing elements and the target object. In an embodiment, the magnetic field sensor selects two or more magnetic field sensing elements that have a greatest combined relative distance from an edge of the target object. In an embodiment, the magnetic field sensor selects two or more magnetic field sensing elements by weighting each generated electronic signal by a respective weight coefficient, each respective weight coefficient based upon the relative distance between each of the plurality of magnetic field sensing elements and the target object.

In an embodiment, the gear shift lever moves along one or more translation axes and a rotation axis. In an embodiment, the magnetic field sensor determines the position of the gear shift lever by comparing the difference of amplitudes between the electronic signals generated by each of the selected set of the plurality of magnetic field sensing elements to one or more threshold levels. In an embodiment, the magnetic field sensor detects at least three positions of the gear shift lever. In an embodiment, if the difference of amplitudes reaches a first threshold level, the gear shift lever is determined to be in a first position. If the difference of amplitudes reaches a second threshold level but does not reach the first threshold level, the gear shift lever is determined to be in a second position. If the difference of amplitudes does not reach the second threshold level, the gear shift lever is determined to be in a third position. In an embodiment, the second position corresponds to a neutral position.

In an embodiment, the at least one magnetic field sensor includes an electronic circuit coupled to receive the first and second sensed magnetic fields, and operable to generate an output signal indicative of the position of the gear shift lever.

In an embodiment, the plurality of magnetic field sensing elements includes at least one of: planar Hall elements, vertical Hall elements, fluxgate elements, and magnetoresistance elements.

In another aspect, a method for determining a position of a gear shift lever of a vehicle is provided. A magnetic field is generated by a back bias magnet influenced by a ferromagnetic target object having selected characteristics. A plurality of magnetic field sensing elements of a magnetic field sensor is disposed proximate to a major ferromagnetic surface of the ferromagnetic target object. Each of the magnetic field sensing elements generate an electronic signal in response to sensed magnetic fields. A selected one of the magnetic field sensor or the ferromagnetic target object is maintained in a stationary position with respect to the gear shift lever. The other one of the magnetic field sensor or the ferromagnetic target object is coupled to the gear shift lever. The magnetic field sensor selects a subset of the plurality of magnetic field sensing elements and determines a magnetic field difference based on a difference of amplitudes between the electronic signals generated by the selected subset of the plurality of magnetic field sensing elements. The difference is related to a relative position of the ferromagnetic target object and the magnetic field sensor. The magnetic field sensor determines a current position from a plurality of positions of the gear shift lever in accordance with the magnetic field difference. The current position of the gear shift lever corresponds to a gear selected by the gear shift lever. The magnetic field sensor determines, based upon the selected characteristics of the ferromagnetic target object, the plurality of positions of the gear shift lever. The ferromagnetic object includes a perimeter around the major ferromagnetic surface, and one of the selected characteristics of the ferromagnetic target object includes a respective one of a plurality of edges proximate to the perimeter.

In an embodiment, the selected characteristics of the ferromagnetic target object include a selected shape of the ferromagnetic target object. The selected shape includes a plurality of features, different ones of the plurality of features corresponding to different ones of the plurality of gears and disposed at different respective positions on the ferromagnetic target such that the magnetic field sensor is proximate to different ones of the plurality of features and distal from other ones of the plurality of features when the gear shift lever is moved to different positions. The sensed magnetic fields have different values when the gear shift lever is in each position. In an embodiment, at least one of the features includes a ledge projecting above the major ferromagnetic surface of the ferromagnetic target object. In an embodiment, at least one of the features includes a notch removed from the major ferromagnetic surface of the ferromagnetic target object. In an embodiment, at least one of the features includes a first radius of a curve of at least a first section of the ferromagnetic target about an axis. In an embodiment, at least one of the plurality of features includes a second radius of a curve of at least a second section of the ferromagnetic target about an axis. In an embodiment, at least one of the plurality of features includes a depression into the major ferromagnetic surface of the ferromagnetic target object. In an embodiment, the features are selected to magnetically interact in different ways with each of the plurality of magnetic field sensing elements when the gear shift lever is in each position. In an embodiment, the at least one magnetic field sensor has different relative distances to the plurality of features when the gear shift lever is moved to positions associated with different respective gears.

In an embodiment, the magnetic field sensor selects a set of the plurality of magnetic field sensing elements based upon a relative distance between each of the plurality of magnetic field sensing elements and the target object. In an embodiment, the magnetic field sensor selects two or more magnetic field sensing elements that have a greatest combined relative distance from an edge of the target object. In an embodiment, the magnetic field sensor selects two or more magnetic field sensing elements by weighting each generated electronic signal by a respective weight coefficient, each respective weight coefficient based upon the relative distance between each of the plurality of magnetic field sensing elements and the target object.

In an embodiment, the magnetic field sensor determines the position of the gear shift lever by comparing the difference of amplitudes between the electronic signals generated by each of the selected set of the plurality of magnetic field sensing elements to one or more threshold levels. In an embodiment, the magnetic field sensor detects at least three positions of the gear shift lever. In an embodiment, if the difference of amplitudes reaches a first threshold level, the gear shift lever is determined to be in a first position. If the difference of amplitudes reaches a second threshold level but does not reach the first threshold level, the gear shift lever is determined to be in a second position. If the difference of amplitudes does not reach the second threshold level, the gear shift lever is determined to be in a third position. In an embodiment, the second position corresponds to a neutral position.

In an embodiment, the at least one magnetic field sensor includes an electronic circuit coupled to receive the first and second sensed magnetic fields, and operable to generate an output signal indicative of the position of the gear shift lever.

In an embodiment, the plurality of magnetic field sensing elements includes at least one of: planar Hall elements, vertical Hall elements, fluxgate elements, and magnetoresistance elements.

BRIEF DESCRIPTION OF THE DRAWING FIGURES

Other aspects, features, and advantages of the described embodiments will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

DETAILED DESCRIPTION

Figure 1:
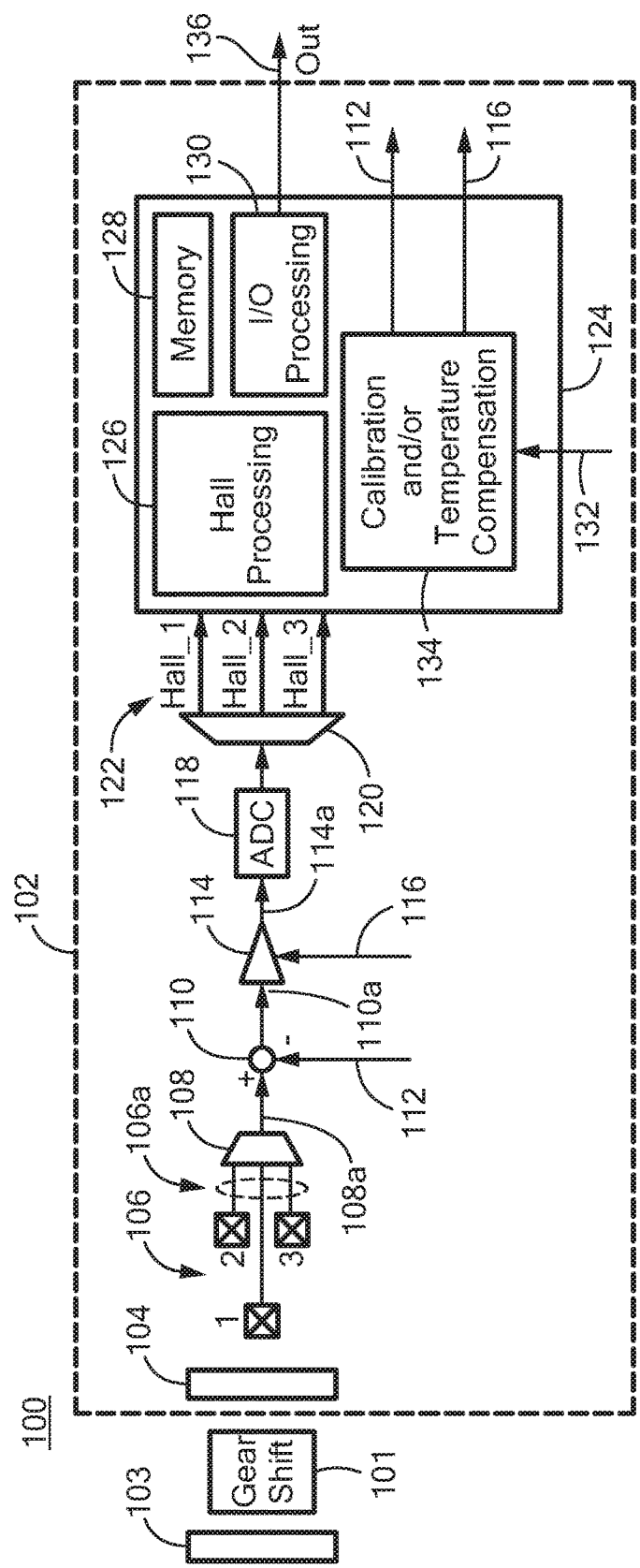
FIG. 1 is a block diagram showing an illustrative gearshift lever position sensing system having a gear shift lever, a magnetic field sensor, and a target object.

As used herein, the term "magnetic field sensing element" is used to describe a variety of electronic elements that can sense a magnetic field. The magnetic field sensing element can be, but is not limited to, a Hall effect element, a fluxgate element, a magnetoresistance element, or a magnetotransistor. There are different types of Hall effect elements, for example, a planar Hall element, a vertical Hall element, and a Circular Vertical Hall (CVH) element. There are also different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element might be a single element or, alternatively, might include two or more magnetic field sensing elements arranged in various configurations, e.g., a half bridge or full (Wheatstone) bridge. Depending on the device type and other application requirements, the magnetic field sensing element might be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

Some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while metal based or metallic magnetoresistance elements (e.g., GMR, TMR, AMR) and vertical Hall elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-bias or other magnet, and a magnetic field sensor that senses a magnetic field density of a magnetic field.

As used herein below, the term "ferromagnetic target object," or simply "target object" is used to describe a mechanical structure, movement of which is sensed by a magnetic field sensor.

As used herein, the term "movement axis" is used to describe an axis along which a target object can move linearly relative to a location of a magnetic field sensor. The term "movement axis" is also used to describe an axis along which the magnetic field sensor can move linearly relative of a location of a ferromagnetic target object. In some arrangements, both the ferromagnetic target object and the magnetic field sensor can move relative to each other along respective movement axes.

As used herein, the term "movement line" is used to describe a line, which might be straight or curved, along which a target object can move relative to a location of a magnetic field sensor. The term "movement line" is also used to describe a line, straight or curved, along which the magnetic field sensor can move relative of a location of a ferromagnetic target object. In some arrangements, both the ferromagnetic target object and the magnetic field sensor can move relative to each other along respective movement lines.

It should be understood that a movement line can be a movement axis and a movement axis can be a movement line. However, a movement line can be curved while a movement axis is straight.

As used herein, the term "rotation axis" is used to describe an axis upon which a target object can rotate or spin. In some arrangements, the movement axis and the rotation axis are parallel to each other. In some arrangements, the movement axis and the rotation axis are the same axis.

Described embodiments provide systems and methods for determining a position of a gear shift lever of a vehicle. In particular, described embodiments can be used to determine at least three gear positions, namely, neutral, reverse, and a grouping of forward gears. A ferromagnetic target object (e.g., 103 of FIG. 1) having selected characteristics influences a magnetic field generated by a back bias magnet (e.g., 104). A magnetic field sensor (e.g., 102) includes a plurality of magnetic field sensing elements (e.g., 106) disposed proximate to a major ferromagnetic surface (e.g., 204 of FIG. 2, 704 of FIG. 7, 804 of FIG. 8, 904 of FIG. 9 or 1004 of FIG. 10) of the ferromagnetic target object. Each of the magnetic field sensing elements generate a respective electronic signal (e.g., 122) in response to respective sensed magnetic fields corresponding to the magnetic field. A selected one of the magnetic field sensor or the ferromagnetic target object is stationary with respect to the gear shift lever (e.g., 101) and the other is coupled to the gear shift lever. The gear shift lever moves to select from among a plurality of gears of the vehicle. The magnetic field sensor selects a set of the plurality of magnetic field sensing elements to determine a difference of amplitudes between the electronic signals generated by the selected set of the plurality of magnetic field sensing elements. The difference is related to a relative position of the ferromagnetic target object and the magnetic field sensor. A current position of the gear shift lever is determined based upon the difference. The selected characteristics of the ferromagnetic target object enable the magnetic field sensor to detect the plurality of positions of the gear shift lever. The ferromagnetic object includes a perimeter (e.g., 205 of FIG. 2, 705 of FIG. 7, 805 of FIG. 8, 905 of FIG. 9 or 1005 of FIG. 10) around the major ferromagnetic surface, and one of the selected characteristics of the ferromagnetic target object includes a respective one of a plurality of edges (e.g., 206 of FIGS. 2, 706a and 706b of FIGS. 7, 806 and 812 of FIGS. 8, 906 and 912 of FIG. 9 or 1006 and 1012 of FIG. 10) proximate to the perimeter.

Referring to FIG. 1, a gear shift sensing system 100 is associated with a gear shift lever 101 that may be used in any type of vehicle, including, but not limited to automobiles, trucks, and boats. Gear shift sensing system 100 includes magnetic field sensor 102 that may include a plurality of magnetic field sensing elements, shown to be three magnetic field sensing elements labeled 1, 2 and 3, which are shown collectively as magnetic field sensing elements 106. Magnet 104 may be disposed within magnetic field sensor 102 or otherwise can be proximate to the magnetic field sensor 102. Magnet 104 provides a magnetic field to back bias magnetic field sensing elements 106 in a "back-biased" arrangement. In some embodiments, magnetic field sensor 102 may be implemented as an integrated circuit.

In some embodiments, magnetic field sensing elements 106 may be Hall effect elements, and are disposed in a plane proximate to ferromagnetic target object 103. In some embodiments, magnet 104 is disposed on a distal side of magnetic field sensing elements 106 from ferromagnetic target 103. Ferromagnetic objects passing near to magnet 104 will tend to alter the magnetic field surrounding magnet 104. These alterations can be sensed by magnetic field sensing elements 106, each of which generates magnetic field signals in response to a sensed magnetic field. The magnetic field signals are shown collectively as magnetic field signals 106a. Multiplexer 108 may receive magnetic field signals 106a and generate a multiplexed magnetic field signal 108a having a series sequence of magnetic field signals 106a received by the multiplexer 108.

In some embodiments, magnetic field sensor 102 may include summing node 110 to receive multiplexed magnetic field signal 108a and to receive a correction signal 112. For example, correction signal 112 might be operable to reduce a direct current (DC) offset of multiplexed magnetic field signal 108a. Summing node 110 generates corrected signal 110a. Amplifier 114 receives corrected signal 110a and calibration signal 116, and generates calibrated signal 114a. For example, calibration signal 116 might be operable to calibrate gain of amplifier 114, for example, to compensate for temperature variations of gear shift sensing system 100. Analog-to-digital converter (ADC) 118 receives calibrated signal 114a and generates calibrated digital signal 118a.

Digital demultiplexer 120 receives calibrated digital signal 118a and may generate one or more calibrated digital magnetic field signals, shown collectively as calibrated digital magnetic field signals 122. For example, digital demultiplexer 120 may generate a calibrated digital magnetic field signal corresponding to each magnetic field sensing element 106. Thus, for the embodiment shown in FIG. 1, digital demultiplexer 120 generates three calibrated digital magnetic field signals, one corresponding to each magnetic field sensing element 106, labeled Hall_1, Hall_2 and Hall_3 (although magnetic field sensing elements 106 are not limited only to Hall elements).

Calibrated digital magnetic field signals 122 are provided to processing system 124. Processing system 124 can include a plurality of differencing processors, memory or other circuitry. In some embodiments, processing system 124 may include Hall processing system 126, memory 128, input/output (I/O) processing system 130, and calibration and/or temperature compensation system 134. Calibration and/or temperature compensation system 134 may generate correction signal 112 and calibration signal 116, for example based on temperature compensation signal 132 provided to calibration and/or temperature compensation system 134. Hall processing system 126 may process calibrated digital magnetic field signals 122 to determine a position of, and therefore a gear (e.g., at least neutral, reverse, and any of the forward gears taken as a collective group) selected by, gear shift lever 101. In some embodiments, Hall processing system 126 may compare differences of two or more of calibrated digital magnetic field signals 122, e.g., differences of two or more pairs of calibrated digital magnetic field signals 122. The difference or differences may then be compared with one or more predetermined values stored in memory 128 to generate a selected gear signal (not shown), which is indicative of the gear selected by gear shift lever 101.

The selected gear signal may be provided to I/O processing system 130, which generates output signal 136. Output signal 136 may represent the selected gear (e.g., include data related to the selected gear signal), but may be generated in one of a variety of output signal formats. For example, output signal 136 may be generated as a serial or parallel digital signal, a pulse width modulated (PWM) signal or an analog signal. In other embodiments, output signal 136 may be generated in accordance with various signal formats, for example, a Single Edge Nibble Transmission (SENT) format, a Serial Peripheral Interface (SPI) format, a Local Interconnect Network (LIN) format, a CAN (Controller Area Network) format, an Inter-Integrated Circuit (I2C) format, or other similar signal formats. For example, in automotive applications, output signal 136 might be communicated to an Electronic/Engine Control Unit (ECU), Engine Control Module (ECM) or similar controller of an automotive system.

In some embodiments, ferromagnetic target object 103 may be coupled to gear shift lever 101 and magnetic field sensor 102 is coupled to a structure (not shown) that is stationary relative to gear shift lever 101 as gear shift lever 101 is moved (e.g., shifted) between gears. In other embodiments, magnetic field sensor 102 may be coupled to gear shift lever 101 and ferromagnetic target 103 is coupled to a structure (not shown) that is stationary relative to gear shift lever 101 as gear shift lever 101 is moved (e.g., shifted) between gears. In either arrangement, magnetic field sensor 102 is responsive to a position of ferromagnetic target 103 relative to magnetic field sensor 102, and therefore, to a position of gear shift lever 101.

As described herein, ferromagnetic target 103 has a shape (e.g., a perimeter shape) and features (i.e., characteristics) that allow magnetic field sensor 102 to identify the position of gear shift lever 101 in one or more gear positions associated with different gears of the vehicle. In one embodiment, three (3) specific positions (e.g., gears) are detected using shapes and features of ferromagnetic target 103 and a back bias differential magnetic field sensor (e.g., 102). In described embodiments, to detect at least three specific positions, magnetic field sensor 102 can employ three magnetic field sensing elements 106 disposed at different locations relative to ferromagnetic target 103. Thus, described embodiments may detect neutral, reverse and forward gears collectively (or at least one specific gear), while being substantially insensitive to external perturbations of the magnetic fields, and being independent of movement of magnetic field sensor 102 relative to ferromagnetic target 103 around the Z axis of FIG. 2. Described embodiments employ a differential measurement of the magnetic field, instead of a single direct measurement, to generate an output that is less sensitive to changes in an air gap distance between ferromagnetic target 103 and magnetic field sensor 102.

Figure 2:
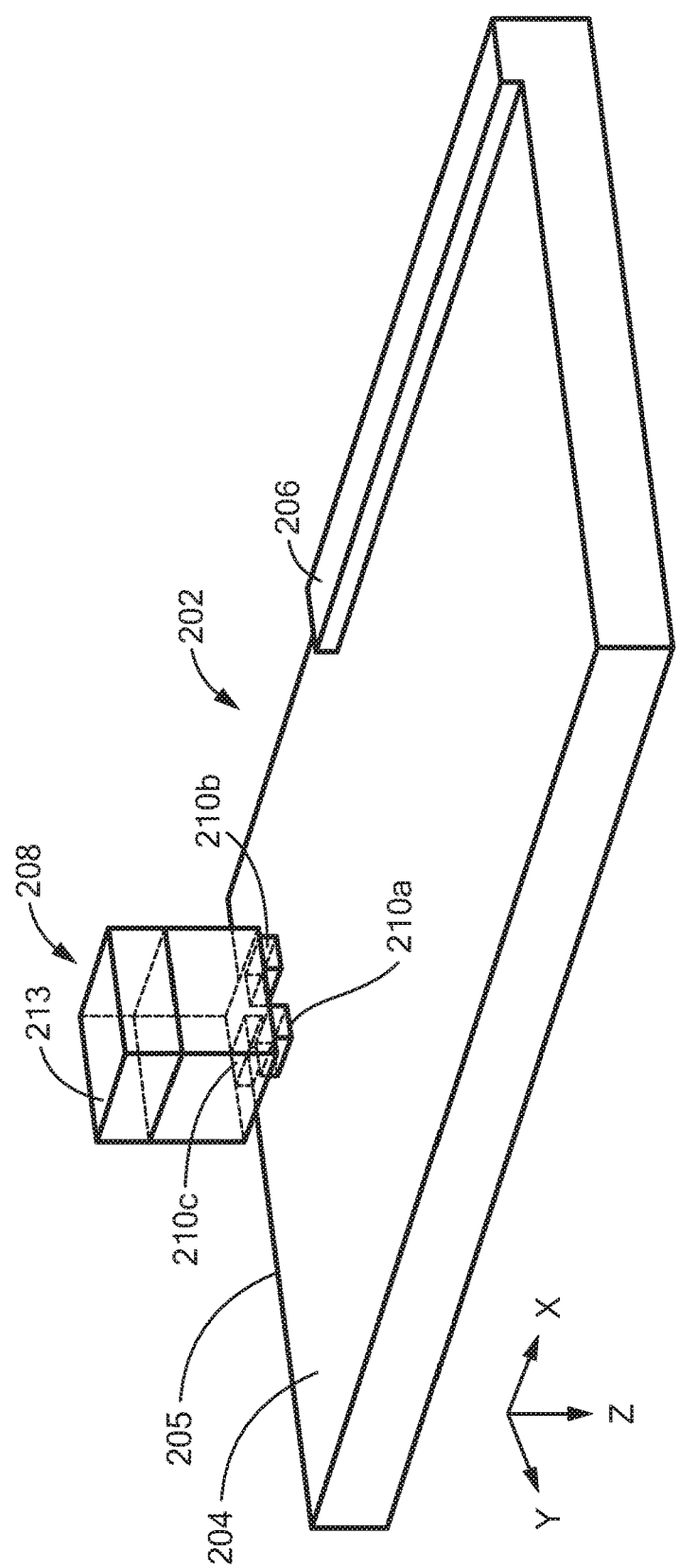
FIG. 2 is a diagram showing an isometric view of a gearshift lever position sensing system having an illustrative target object disposed proximate to a magnetic field sensor with three magnetic field sensing elements.

Referring to FIG. 2, an illustrative structure of ferromagnetic target object 103 of FIG. 1 is shown as ferromagnetic target object 202. Illustrative ferromagnetic target object 202 has a shape operable to allow magnetic field sensor 208 to detect three relative positions of ferromagnetic target object 202. As shown, magnetic field sensor 208 may include three magnetic field sensing elements, 210*a*, 210*b* and 210*c*.

Magnetic field sensor 208 may also include back bias magnet 213. In some embodiments, back bias magnet 213 is magnetized along a Z axis as labeled in FIG. 2. In described embodiments, back bias magnet 213 is a standard magnet, such as a parallelepiped magnet, and is not a zero Gauss magnet. In some embodiments, magnet 213 can have a square shape, a rectangular shape, or a cylindrical shape.

Magnetic field sensing elements 210*a*, 210*b* and 210*c* are disposed in an X-Y plane as labeled in FIG. 2. In some embodiments, magnetic field sensing elements 210*a*, 210*b* and 210*c* are sensitive to magnetic fields along the Z axis. In an embodiment, ferromagnetic target object 202 moves along X and Y axes (e.g., two translations) relative to magnetic field sensor 208. In another embodiment, magnetic field sensor 208 moves along the X and Y axes (e.g., two translations) relative to ferromagnetic target object 202. Ledge 206 is disposed on major surface 204 of ferromagnetic target object 202 and has a surface in the X-Y plane. For example, as shown in FIG. 2, ledge 206 extends along part of a length along the X axis of ferromagnetic target object 202. In an embodiment, ledge 206 does not extend along the full length of ferromagnetic target object 202 along the X axis.

Figure 3:
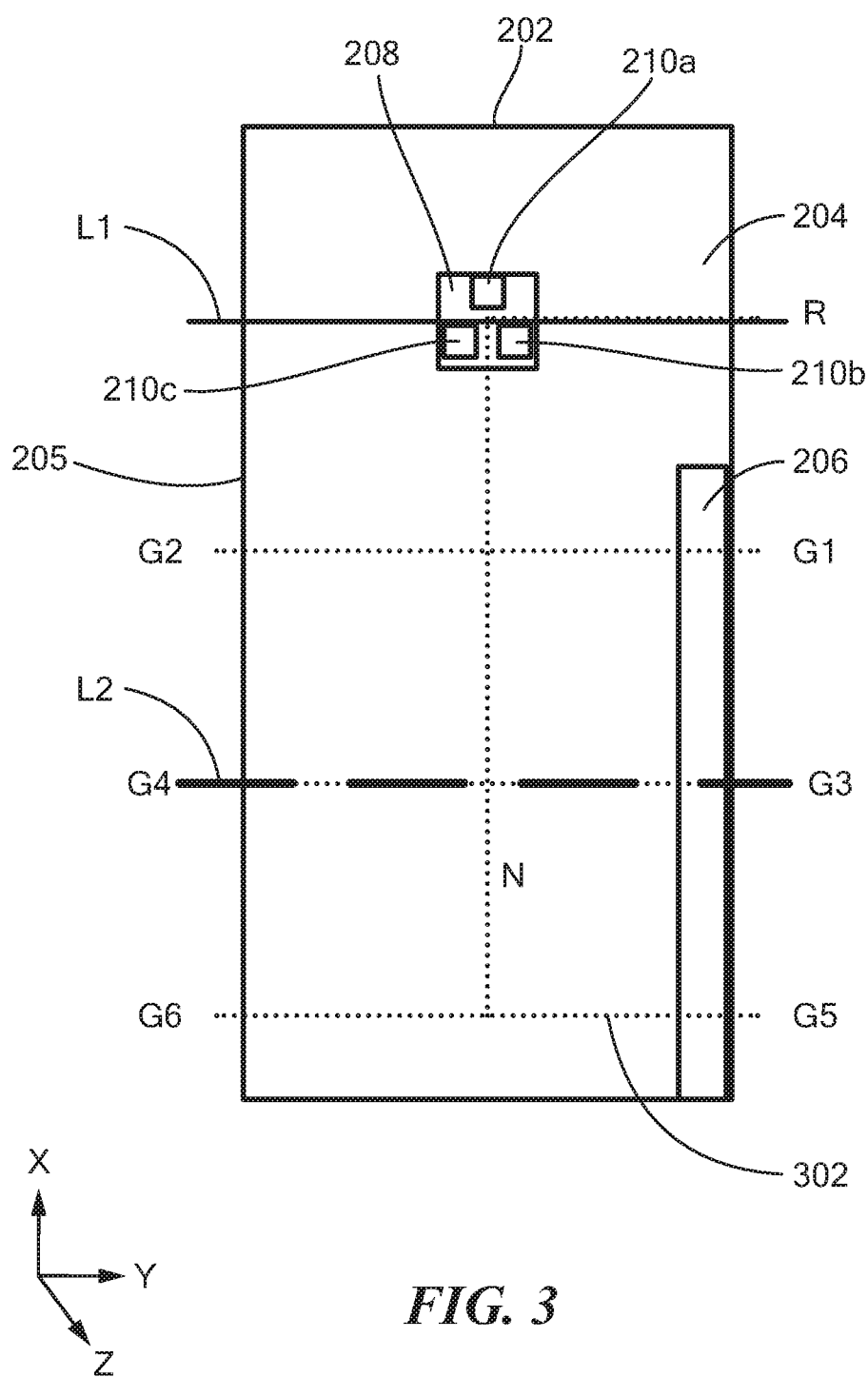
FIG. 3 is a diagram showing a top view of the gearshift lever position sensing system and target object of FIG. 2.

Referring to FIG. 3, in which like elements of FIG. 2 are shown having like reference designations, a top view of ferromagnetic target object 202 and magnetic field sensor 208 in gear shift system 300 is shown. FIG. 3 shows that illustrative gear shift system 300 may have eight gears: G1, G2, G3, G4, G5, G6, Reverse (R) and Neutral (N), although other systems may have fewer than eight or more than eight gears. The neutral position is referred to herein as a gear, although the neutral position is sometimes considered to represent an absence of a gear or not being in gear. Dotted line 302 indicates illustrative movement (e.g., translation) of a manual vehicle gear shift (e.g., gear shift lever 101 of FIG. 1) to select associated gears of a vehicle. As would be understood, other gear arrangements may be employed.

Ferromagnetic target object 202 is disposed with respect to the movement (translation) of gear shift lever 101. For the illustrative embodiment shown in FIG. 2, magnetic field sensor 208 may be mounted to gear shift lever 101 such that magnetic field sensor 208 moves, with the gear shift lever 101, relative to ferromagnetic target object 103. As magnetic field sensor 208 moves along dotted line 302, magnetic fields sensed by magnetic field sensing elements 210*a*, 210*b* and 210*c* may change. In some embodiments, a differential field signal might be determined based on a difference between selected ones of the magnetic fields sensed by magnetic field sensing elements 210*a*, 210*b* and 210*c* (e.g., by determining a difference between selected ones of magnetic field signals 122 of FIG. 1).

It should be appreciated that, at position R (reverse), magnetic field sensor 208 can overlap a perimeter edge of ferromagnetic target object 202, at position N (neutral), magnetic field sensor 208 does not overlaps a perimeter edge of ferromagnetic target object 202, at a set of positions G2, G4, G6 (forward gears 2, 4, 6), magnetic field sensor 208 can overlap a different perimeter edge of ferromagnetic target object 202, and at a set of positions G1, G3, G5 (forward gears 1, 3, 5), magnetic field sensor 208 can overlap ledge 206. Magnetic field sensor 208 is operable to detect and identify reverse, neutral, and forward gears.

Figure 4:
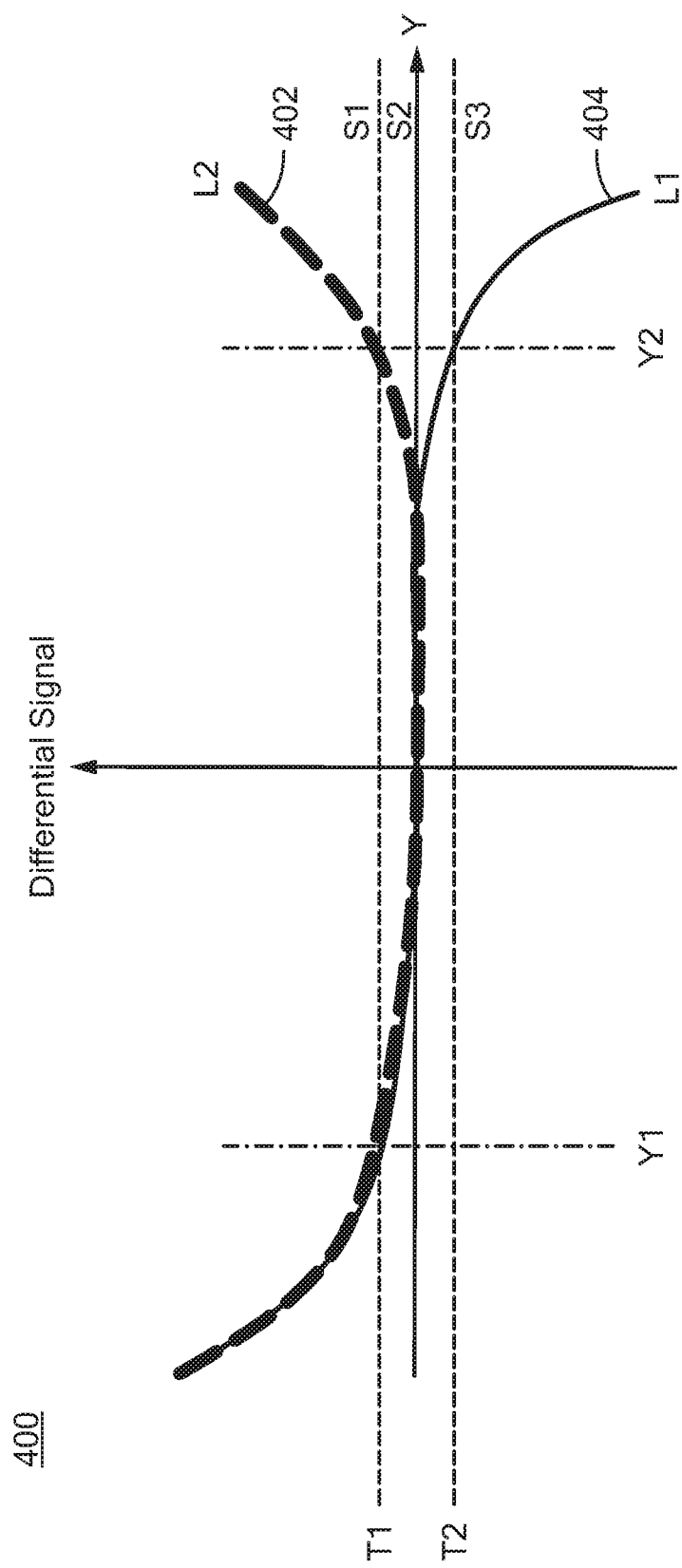
FIG. 4 is a diagram showing a plot of differential signals generated by the magnetic field sensor of FIGS. 1-3 versus relative motion of the gear shift lever and the target object along the lines shown in FIG. 3.

Referring to FIG. 4, plot 400 has a horizontal axis with a scale in units of distance in the Y axis of figures herein, and a vertical axis with a scale in units of differential signal in arbitrary units. Differential signal curves 402 and 404, represent differential magnetic field signals associated with magnetic field sensing elements 210b, 210c of FIG. 2 aligned along the Y axis of FIG. 2 for relative position of magnetic field sensor 208 and ferromagnetic target object 204 along line L1 of FIG. 3 (curve 404) and line L2 of FIG. 3 (curve 402), which are both parallel to the Y axis. Plot 400 shows the magnitude of the differential signal on the vertical axis, versus position along the Y axis as in FIG. 3. The differential magnetic field is increasingly positive or negative (e.g., at large translation of gear shift lever 101).

It should be appreciated that the right hand side of curve 404 is indicative of the position of the reverse gear (R), for which magnetic field sensor 208 of FIG. 2 is proximate to a right hand perimeter of ferromagnetic target object 204. It should be also appreciated that the right hand side of curve 402 is indicative of the position of the gear G3 (also G1 and G5), for which magnetic field sensor 208 of FIG. 2 is also proximate to a right hand perimeter of ferromagnetic target object 204, but magnetic field sensor 208 is also over ledge 206. Thus, the right hand side of curve 404 is negative while the right hand side of curve 402 is positive.

Described embodiments may employ a plurality of thresholds to determine the position (e.g., selected gear) of gear shift lever 101. As shown in FIG. 4, some embodiments may employ two thresholds, T1 and T2, to determine 3 positions (e.g., gears). For example, when the differential magnetic field signal, dH, is greater than threshold T1, gear shift lever 101 may be determined to be in a position, S1, associated with a first given gear. For example, position S1 may correspond to one or more forward gears. When the differential magnetic field signal, dH, is between thresholds T1 and T2, gear shift lever 101 may be determined to be in a position, S2, associated with a second given gear over a position range from Y1 to Y2. For example, position S2 may correspond to neutral. When the differential magnetic field signal, dH, is less than threshold T2, gear shift lever 101 may be determined to be in a position, S3, associated with a third given gear. For example, position S3 may correspond to reverse.

In order to be independent of the orientation of magnetic field sensing elements 210 around the Z axis with respect to ferromagnetic target object 202, described embodiments employ more than two magnetic field sensing elements.

Figure 6:
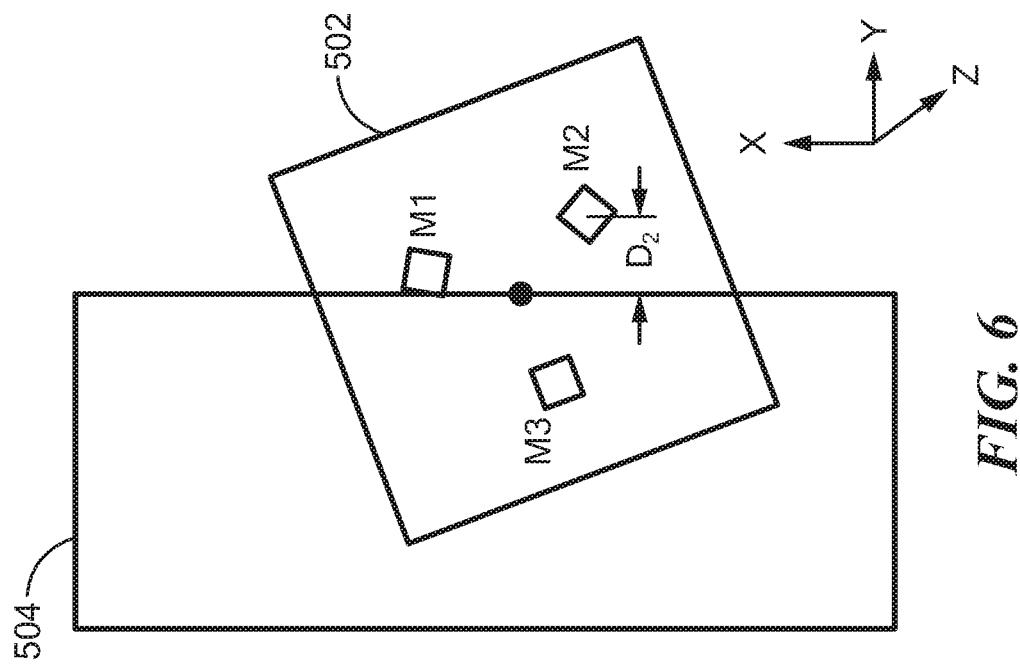
FIG. 6 is a diagram showing a top view of another illustrative arrangement of three magnetic field sensing elements with respect to a magnet and an edge of an illustrative target object of FIG. 3.
Figure 5:
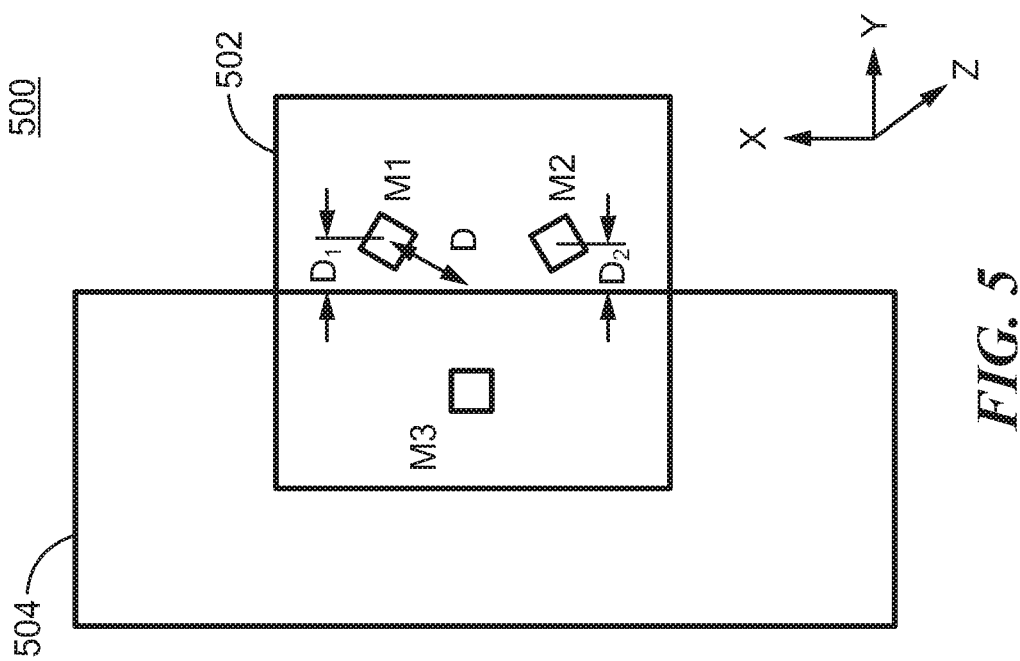
FIG. 5 is a diagram showing a top view of an illustrative arrangement of three magnetic field sensing elements with respect to a back bias magnet and an edge of an illustrative target object of FIG. 3.

Referring to FIGS. 5 and 6, illustrative arrangement 500 of magnetic field sensing elements M1, M2 and M3 is shown. As shown, magnetic field sensing elements M1, M2 and M3 may be disposed in a circular arrangement relative to each other (e.g., on a radius, D). Magnetic field sensing elements M1, M2 and M3 may be equidistant from each other. FIG. 5 depicts a first illustrative orientation of magnetic field sensing elements M1, M2 and M3 relative to ferromagnetic target feature 504 (e.g., such as ledge 206, etc.). A magnet 502 can be disposed over the magnetic field sensing elements M1, M2, M3. FIG. 6 shows a second illustrative orientation of magnetic field sensing elements M1, M2 and M3 relative to ferromagnetic target feature 504, which may be the ferromagnetic target, or a feature of the ferromagnetic target (e.g., such as ledge 206, etc.).

In the orientation shown in FIG. 5, magnetic field sensor M3 is disposed over ferromagnetic target feature 504, while magnetic field sensors M1 and M2 are not disposed over ferromagnetic target feature 504. As shown in FIG. 5, magnetic field sensing element M1 is a distance $D_1$ away from ferromagnetic target feature 504 and magnetic field sensing element M2 is a distance $D_2$ away from ferromagnetic target feature 504. As shown in the illustrative position of FIG. 5, distances $D_1$ and $D_2$ may be approximately equal. In this orientation, described embodiments desirably employ the magnetic field signals (e.g., magnetic field signals 122) generated by magnetic field sensing elements M1 and M3 (or M2 and M3) to generate the differential magnetic field signal, dH. For example, dH=M3−M2, or dH=M3−M1, or both.

In the orientation shown in FIG. 6, magnetic field sensor M3 is disposed over ferromagnetic target feature 504, magnetic field sensor M2 is not disposed over ferromagnetic target feature 504, and magnetic field sensor M1 is partially disposed over ferromagnetic target feature 504 (e.g., distance $D_1$ is almost zero). As shown in FIG. 6, magnetic field sensing element M2 is a distance $D_2$ away from ferromagnetic target feature 504. As shown in the illustrative position of FIG. 6, distance $D_2$ may be greater than distance $D_1$. In this orientation, described embodiments desirably employ the magnetic field signals (e.g., magnetic field signals 122) generated by magnetic field sensing elements M2 and M3 to generate the differential magnetic field signal, dH. For example, dH=M3−M2.

As shown in FIGS. 5 and 6, by employing three magnetic field sensing elements 210a, 210b and 210c, the spacing achieved between the magnetic field sensing elements employed to generate the differential magnetic field signal, dH, may be approximately 1.5D, where D is the radius of a circle about which the magnetic field sensing elements are disposed. In described embodiments, peak-to-peak differential field variation may be improved by increasing D (e.g., increasing the radius of the circle about which the magnetic field sensing elements are disposed), limited by a die size of the magnetic field sensor (e.g., 102).

Some described embodiments may generate the differential magnetic field signal, dH, as the difference between the magnetic field signals (e.g., 122) generated by the two magnetic field sensing elements with the largest spacing relative to ferromagnetic target feature 504.

Another embodiment may employ a weighted sum of the magnetic field signals (e.g., 122) to generated the differential magnetic field signal, dH. For example, some embodiments may add the signals by:

$$dH = \sum_{i=1}^{n} \alpha_i \cdot M_i \tag{1}$$

where n is the total number of magnetic field sensing elements and $\alpha_i$ are n weighting coefficients associated with the n magnetic field sensing elements. In an embodiment, weighting coefficients $\alpha_i$ are between −1 and 1, where:

$$\sum_{i=1}^{n} \alpha_i = 0 \tag{2}$$

such that external magnetic fields (e.g., perturbations and glitches) are rejected. In illustrative embodiments shown in FIGS. 5 and 6 having three magnetic field sensing elements (e.g., n=3), one might employ weighting coefficients $\alpha_1=0$, $\alpha_2=-1$, and $\alpha_3=1$. Another embodiment having three magnetic field sensing elements (e.g., n=3) might employ weighting coefficients $\alpha_1=-0.5$, $\alpha_2=-0.5$, and $\alpha_3=1$ (e.g., dH=M3−(M1+M2)/2).

Figure 7:
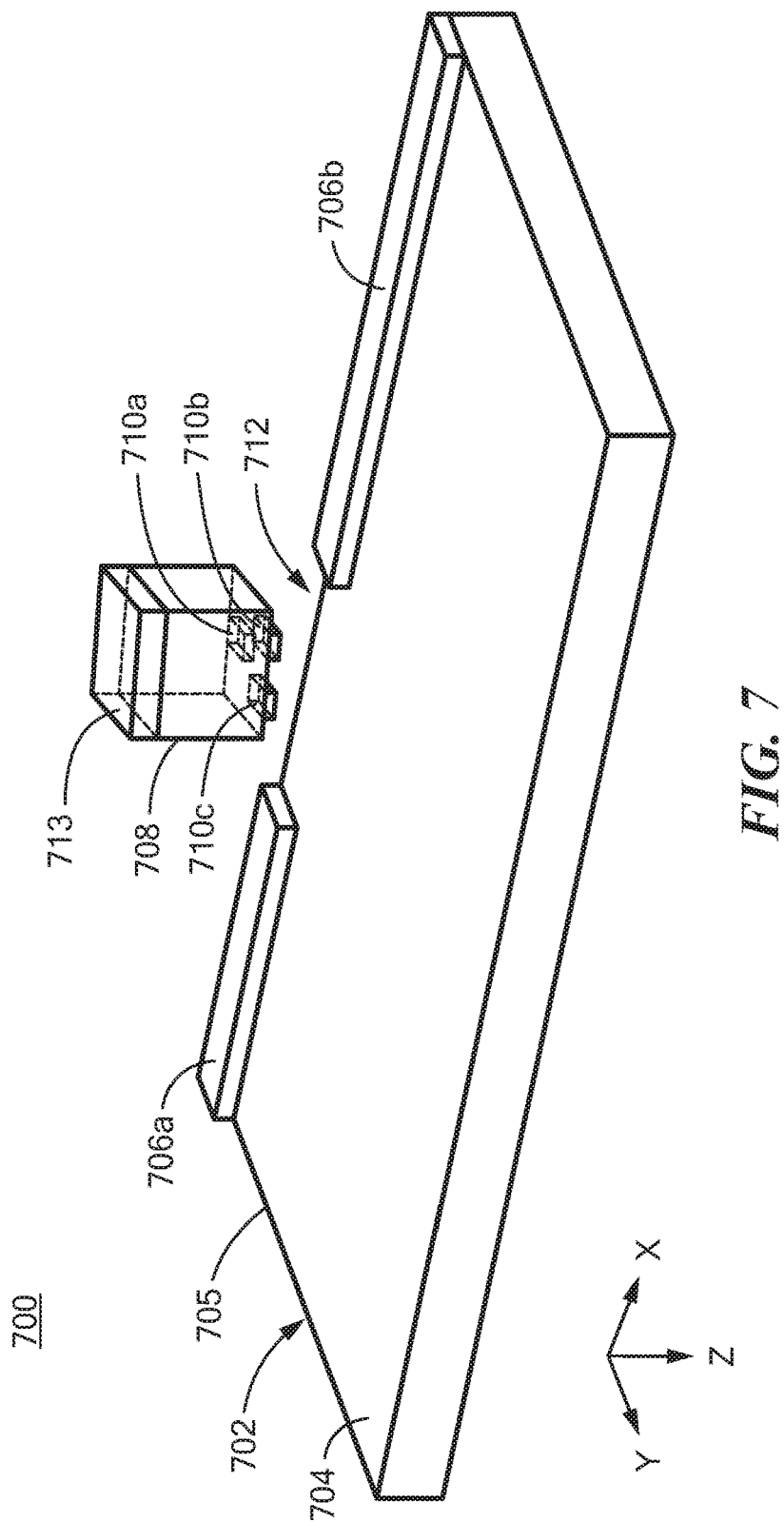
FIG. 7 is a diagram showing an isometric view of another illustrative target object having a ridge disposed proximate to a magnetic field sensor with three magnetic field sensing elements.
Figure 8:
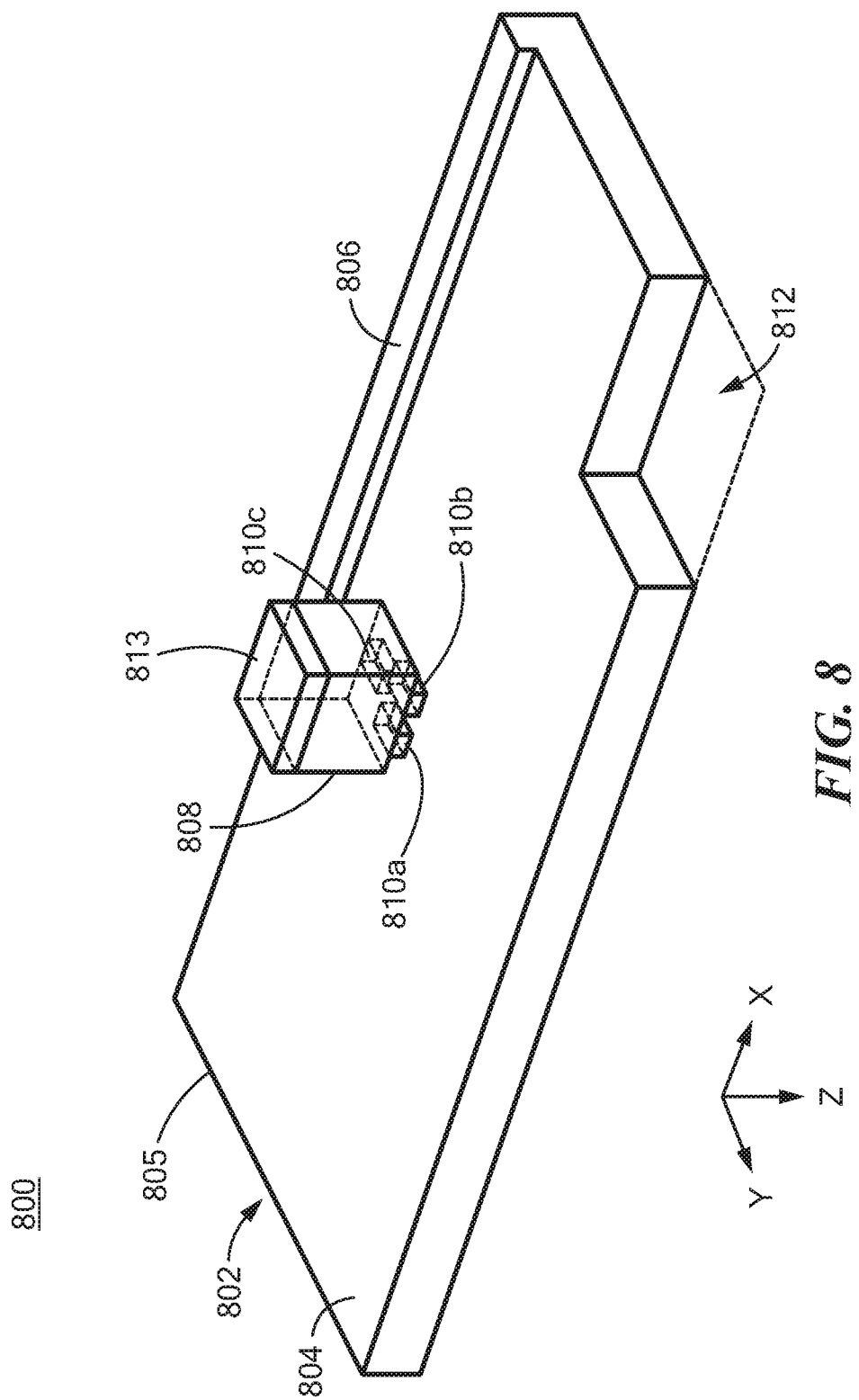
FIG. 8 is a diagram showing an isometric view of another illustrative target object having a notched ridge, the target object disposed proximate to a magnetic field sensor with three magnetic field sensing elements.

Referring to FIGS. 7 and 8, other illustrative embodiments may employ ferromagnetic target objects as shown in FIGS. 7 and 8, in which magnetic field sensors 708, 808 with magnet 713, 813 and magnetic field sensing elements 710a, 710b, 710c, 810a, 810b, 810c can be the same as or similar to magnetic field sensor 208 with magnet 213 and magnetic field sensing elements 210a, 210b, 210c of FIG. 2. For example, in FIG. 7, ferromagnetic target object 702 has a ledge 706 having a first ledge portion 706a and a second ledge portion 706b, disposed along the length of ferromagnetic target object 702 along the X axis. Ledge 706 has a cutout region 712 disposed between first ledge portion 706a and a second ledge portion 706b. Ledge 706 is thus adapted to change which gear is detected at position S3 of FIG. 4. For example, as shown in FIG. 7, position S3 would correspond to gear G1 of FIG. 3, and state S1 would correspond to reverse R (e.g., as shown in FIG. 3).

In some embodiments, it may be desired to detect a given gear position earlier or later than other gear positions. For example, FIG. 8 shows another illustrative ferromagnetic target object 802, which is similar to ferromagnetic target object 202 of FIG. 2, but including a notch or cutout 812. Notch 812 is located in a corner of a perimeter of a major surface 804 of ferromagnetic target object 802, the major surface 804 disposed in the X-Y plane. For example, notch 812 may be disposed in a corner of ferromagnetic target object 802 opposite ledge 806 in the Y direction. For example, notch 812 allows early detection of G6 compared to others gears. Other locations of notch 812 may correspond to other gears (e.g., as shown in FIG. 3).

As described, illustrative embodiments may be employed to sense position along X and Y axes.

Figure 9:
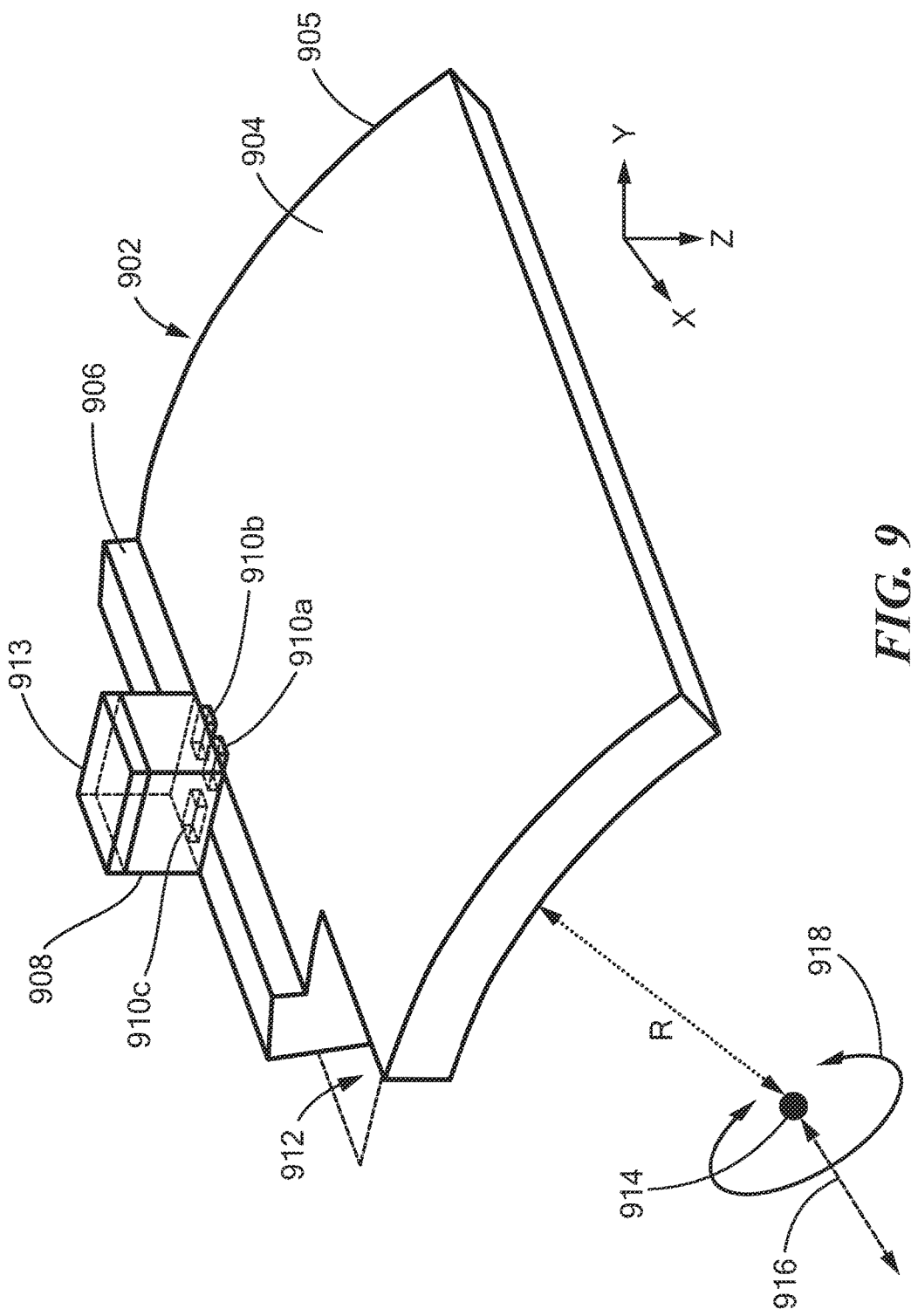
FIG. 9 is a diagram showing an isometric view of another illustrative curved target object having a ridge and a notch, the target object disposed proximate to a magnetic field sensor with three magnetic field sensing elements.
Figure 10:
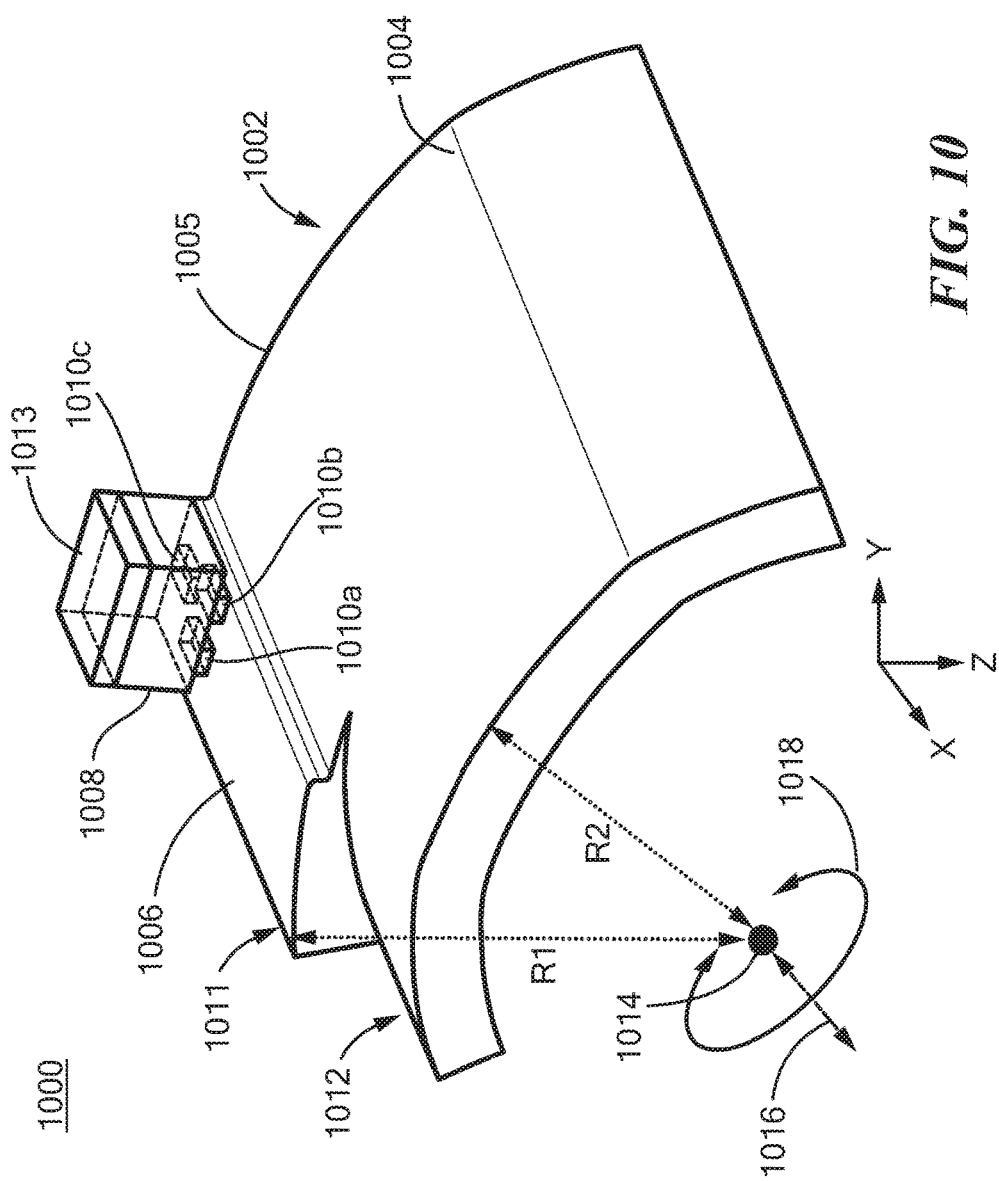
FIG. 10 is a diagram showing an isometric view of another illustrative curved target object having sections with different radii, the target object disposed proximate to a magnetic field sensor with three magnetic field sensing elements.

Referring to FIGS. 9 and 10, in which magnetic field sensors 908, 1008 with magnet 913, 1013 and magnetic field sensing elements 910a, 910b, 910c, 1010a, 1010b, 1010c can be the same as or similar to magnetic field sensor 208 with magnet 213 and magnetic field sensing elements 210a, 210b, 210c of FIG. 2. Other embodiments may be employed to sense a rotation (e.g., around an X axis) and a translation (along the X axis). For example, FIG. 9 shows illustrative ferromagnetic target object 902, which may be a section of a cylinder having a radius R (e.g., from a center 914 of the cylinder). Line 918 indicates that ferromagnetic target object 902 may rotate about the X axis, and line 916 indicates that ferromagnetic target object 902 may also move in a translation along the X axis. Magnetic field sensor 908 may produce differential magnetic field signals responsive to relative position relative to ferromagnetic target object 902 similarly to the signals shown in FIG. 4. Ferromagnetic target object 902 has sharp edges (e.g., edge 906 and notch or cutout 912) that create sharp variations of the differential magnetic field signal with a small displacement.

FIG. 10 shows illustrative ferromagnetic target object 1002, which may be a section of a cylinder having a first section 1011 having first radius R1 and a second section 1012 having a second radius R2 (e.g., from a center 1014 of the cylinder). First section 1011 may also have a chamfered ledge 1006. Line 1018 indicates that ferromagnetic target object 1002 may rotate about the X axis, and line 1016 indicates that ferromagnetic target object 1002 may also move in a translation along the X axis. In response to the varying radius of curvature (e.g., R1 and R2) and chamfered ledge 1006, magnetic field sensor 1008 may generate differential magnetic field signals responsive to movement relative to ferromagnetic target object 1002 as shown in FIG. 11.

Figure 11:
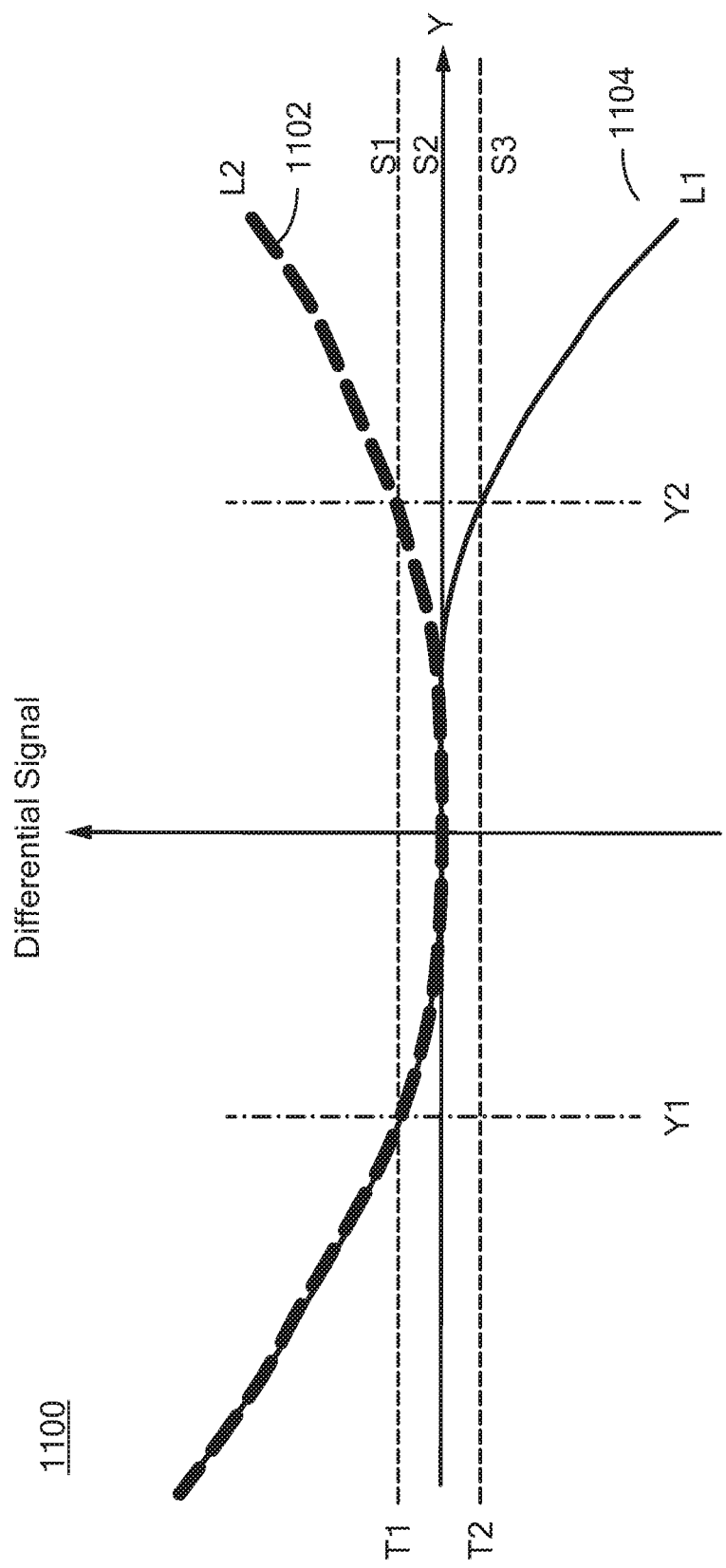
FIG. 11 is a diagram showing a plot of differential signals generated by the magnetic field sensor of FIG. 10 versus relative motion of the gear shift lever and the target object along the lines shown in FIG. 3.

As shown in FIG. 11, thresholds, T1 and T2 determine 3 positions (e.g., gears or groups of gears). For example, when the differential magnetic field signal, dH, is greater than threshold T1, gear shift lever 101 may be determined to be in a position, S1, associated with a first given gear. For example, position S1 may correspond to one or more forward gears. When the differential magnetic field signal, dH, is between thresholds T1 and T2, gear shift lever 101 may be determined to be in a position, S2, associated with a second given gear over a position range from Y1 to Y2, which is a smaller range than that shown in FIG. 4. The differential field is also spread on a larger displacement around positions S2 and S3. Position S2 may correspond to neutral. When the differential magnetic field signal, dH, is less than threshold T2, gear shift lever 101 may be determined to be in a position, S3, associated with a third given gear. Position S3 may correspond to reverse.

Figure 12:
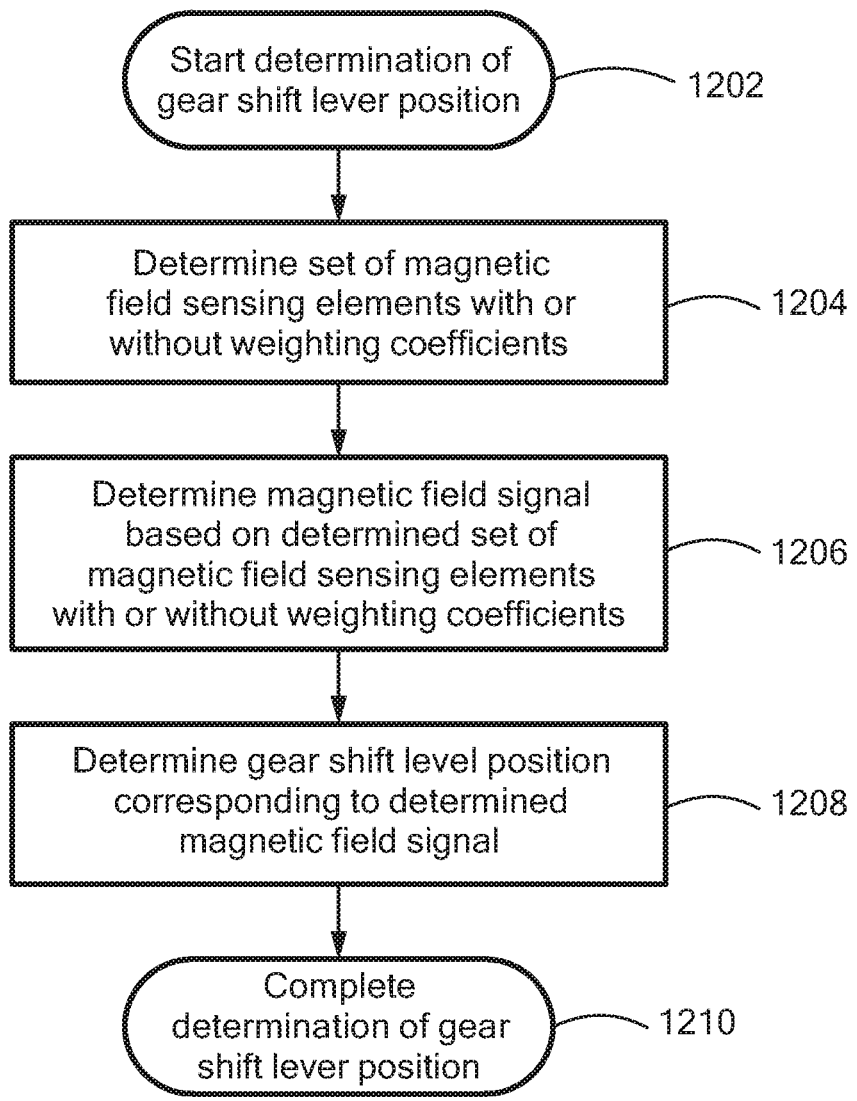
FIG. 12 is a flow diagram showing an illustrative technique for operating the magnetic field sensor of FIG. 1.

It should be appreciated that FIG. 12 shows a flowchart corresponding to the below contemplated technique which would be implemented in a magnetic field sensor, e.g., 102 (FIG. 1). Rectangular elements (typified by element 1202 in FIG. 12), herein denoted "processing blocks," represent computer software instructions or groups of instructions. Diamond shaped elements (of which there are none) herein denoted "decision blocks," represent computer software instructions, or groups of instructions, which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring to FIG. 12, a flow diagram of illustrative process 1200 for determining a gear shift lever position is shown. At block 1202, process 1200 starts. At block 1204, in some embodiments, magnetic field sensor 102 determines a set of magnetic field sensing elements (e.g., signals 122) to use to generate the differential magnetic field signal, dH. For example, as described in regard to FIGS. 5 and 6, magnetic field sensor 102 may select two magnetic field sensing elements having a greatest distance from an edge of the ferromagnetic target object (e.g., magnetic field sensing elements M2 and M3 as shown in FIG. 6). In other words, magnetic field sensor 102 may select two magnetic field sensing elements having a greatest distance (e.g., $D_1+D_2$ as shown in FIGS. 5 and 6) from the ferromagnetic target object to guarantee the largest magnetic field signal. In some embodiments, at block 1204, magnetic field sensor 102 determines weighting coefficients for each of the magnetic field sensing elements (e.g., to weight signals 122) used to generate the differential magnetic field signal, dH. In some embodiments, magnetic field sensor 102 may determine a set of magnetic field sensing elements, and also determine weighting coefficients for the selected set of magnetic field sensing elements.

At block 1206, the differential magnetic field signal, dH, is generated based on selected set of magnet field sensing elements with or without determined weighting coefficients.

At block 1208, the position of a gear shift lever (e.g., gear shift lever 101) is determined based upon the differential magnetic field signal, dH, generated at block 1206. Magnetic field sensor 102 outputs the position of the gear shift lever (e.g., as output signal 136). At block 1210, process 1200 completes. Process 1200 may be performed each time a position of the gear shift lever is determined.

Although described herein as being employed in a gear shift sensing system to determine a gear shift lever position (e.g., in a vehicle gearbox), and in particular for a neutral gear sensor, described embodiments may be employed in other applications requiring detection of three positions in a system having two axes of movement or translation.

Described embodiments are fully differential and employ back bias magnets and ferromagnetic target objects. In some embodiments, the magnet can be integrated in the package with the magnetic field sensor. Some embodiments have no upper limit for the sensed magnetic field level.

In described embodiments, processing system 124 may be implemented as one or more processors. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

Illustrative embodiments may be implemented as a circuit, an integrated circuit, a multi-chip module, a single card, or a multi-card circuit pack. Various functions of circuit elements may also be implemented as processing blocks in a software program. Such software may be employed in, for example, a digital signal processor, microcontroller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

It should be understood that the steps of the illustrative methods and processes set forth herein are not necessarily required to be performed in the order described, and the order of the steps of such methods and processes should be understood to be merely examples. Likewise, additional steps might be included in such methods and processes, and certain steps might be omitted or combined, in methods and processes consistent with various embodiments.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A system for determining a position of a gear shift lever of a vehicle, the system comprising:
   a ferromagnetic target object having selected characteristics;
   a back bias magnet configured to generate a magnetic field influenced by the ferromagnetic target object; and
   a magnetic field sensor comprising a plurality of magnetic field sensing elements disposed proximate to a major ferromagnetic surface of the ferromagnetic target object, each of the plurality of magnetic field sensing elements configured to generate a respective electronic signal in response to respective sensed magnetic fields;
   wherein a selected one of the magnetic field sensor or the ferromagnetic target object is stationary with respect to the gear shift lever and the other one of the magnetic field sensor or the ferromagnetic target object is coupled to the gear shift lever, the gear shift lever configured to move to select from among a plurality of gears of the vehicle,
   wherein the magnetic field sensor is configured to:
      select a set of only two magnetic field sensing elements of the plurality of magnetic field sensing elements based upon a relative distance between each of the plurality of magnetic field sensing elements and the ferromagnetic target object to determine a magnetic field difference based on a difference of amplitudes between the electronic signals generated by the selected set of the plurality of magnetic field sensing elements, wherein the difference is related to a relative position of the ferromagnetic target object and the magnetic field sensor; and
      determine a current position from a plurality of positions of the gear shift lever in accordance with the magnetic field difference, the current position of the gear shift lever corresponding to a gear selected by the gear shift lever;

wherein the selected characteristics of the ferromagnetic target object are configured to enable the magnetic field sensor to detect the plurality of positions of the gear shift lever; and wherein the magnetic field sensor is positioned between the ferromagnetic target object and the back bias magnet.

2. The system of claim 1 wherein the selected characteristics of the ferromagnetic target object comprise a selected shape of the ferromagnetic target object, the selected shape comprising a plurality of features, different ones of the plurality of features corresponding to different ones of the plurality of gears and disposed at different respective positions on the ferromagnetic target such that the magnetic field sensor is proximate to different ones of the plurality of features and distal from other ones of the plurality of features when the gear shift lever is moved to different positions, wherein the determined magnetic field difference has different values when the gear shift lever is in each position.

3. The system of claim 2, wherein at least one of the plurality of features comprises a ledge projecting above the major ferromagnetic surface of the ferromagnetic target object.

4. The system of claim 2, wherein at least one of the plurality of features comprises a notch removed from the major ferromagnetic surface of the ferromagnetic target object.

5. The system of claim 2, wherein at least one of the plurality of features comprises a first radius of a curve of at least a first section of the ferromagnetic target about an axis.

6. The system of claim 5, wherein at least one of the plurality of features comprises a second radius of a curve of at least a second section of the ferromagnetic target about an axis.

7. The system of claim 2, wherein at least one of the plurality of features comprises a depression into the major ferromagnetic surface of the ferromagnetic target object.

8. The system of claim 2, wherein the plurality of features is selected to magnetically interact in different ways with each of the plurality of magnetic field sensing elements when the gear shift lever is in each position.

9. The system of claim 2, wherein the at magnetic field sensor has different relative distances to the plurality of features when the gear shift lever is moved to positions associated with different respective gears.

10. The system of claim 1, wherein the magnetic field sensor is configured to select the two magnetic field sensing elements by weighting each generated electronic signal by a respective weight coefficient, each respective weight coefficient based upon the relative distance between each of the plurality of magnetic field sensing elements and the target object.

11. The system of claim 1, wherein the gear shift lever is configured to move along one or more translation axes and a rotation axis.

12. The system of claim 1, wherein the magnetic field sensor is configured to determine the position of the gear shift lever by comparing the difference of amplitudes between the electronic signals generated by each of the selected set of the plurality of magnetic field sensing elements to one or more threshold levels.

13. The system of claim 12, wherein the magnetic field sensor is configured to detect at least three positions of the gear shift lever.

14. The system of claim 13, wherein:
if the difference of amplitudes reaches a first threshold level, the gear shift lever is determined to be in a first position;
if the difference of amplitudes reaches a second threshold level but does not reach the first threshold level, the gear shift lever is determined to be in a second position; and
if the difference of amplitudes does not reach the second threshold level, the gear shift lever is determined to be in a third position.

15. The system of claim 14, wherein the second position corresponds to a neutral position.

16. The system of claim 1, wherein the field magnetic field sensor comprises:
an electronic circuit coupled to receive the first and second sensed magnetic fields, and operable to generate an output signal indicative of the position of the gear shift lever.

17. The system of claim 1, wherein the plurality of magnetic field sensing elements comprises at least one of: planar Hall elements, vertical Hall elements, fluxgate elements, and magnetoresistance elements.

18. The system of claim 1, wherein the target object is stationary with respect to the gear shift lever and the magnetic field sensor is coupled to the gear shift lever.

19. The system of claim 1, wherein the plurality of positions of the gear shift lever include at least a first position indicative of a first forward gear, a second position indicative of a second forward gear, and a third position indicative of neutral.

20. The system of claim 1, wherein the selected one of the magnetic field sensor or the ferromagnetic object that is coupled to the gear shift lever is operable to move along at least two axes of translation relative to the other one of the magnetic field sensor or the ferromagnetic target object.

21. The system of claim 1, wherein the two magnetic field sensing elements selected have a greatest distance from an edge of the ferromagnetic target object.

22. A method for determining a position of a gear shift lever of a vehicle, the method comprising:
generating a magnetic field by a back bias magnet influenced by a ferromagnetic target object having selected characteristics;
generating, by each of a plurality of magnetic field sensing elements of a magnetic field sensor disposed proximate to a ferromagnetic major surface of the ferromagnetic target object, an electronic signal in response to sensed magnetic fields;
maintaining a selected one of the magnetic field sensor or the ferromagnetic target object in a stationary position with respect to the gear shift lever and coupling the other one of the magnetic field sensor or the ferromagnetic target object to the gear shift lever;
selecting, by the magnetic field sensor, a set of only two magnetic field sensing elements of the plurality of magnetic field sensing elements based upon a relative distance between each of the plurality of magnetic field sensing elements and the ferromagnetic target object and determining a magnetic field difference based on a difference of amplitudes between the electronic signals generated by the selected set of the plurality of magnetic field sensing elements, wherein the difference is related to a relative position of the ferromagnetic target object and the magnetic field sensor;
determining, by the magnetic field sensor, a current position from a plurality of positions of the gear shift lever in accordance with the magnetic field difference, the current position of the gear shift lever corresponding to a gear selected by the gear shift lever; and detecting, by the magnetic field sensor based upon the selected characteristics of the ferromagnetic target object, the plurality of positions of the gear shift lever;

wherein the magnetic field sensor is positioned between the ferromagnetic target object and the back bias magnet.

23. The method of claim 22, wherein the selected characteristics of the ferromagnetic target object comprise a selected shape of the ferromagnetic target object, the selected shape comprising a plurality of features, different ones of the plurality of features corresponding to different ones of the plurality of gears and disposed at different respective positions on the ferromagnetic target such that the magnetic field sensor is proximate to different ones of the plurality of features and distal from other ones of the plurality of features when the gear shift lever is moved to different positions, wherein the magnetic field difference has different values when the gear shift lever is in each position.

24. The method of claim 23, wherein at least one of the plurality of features comprises a ledge projecting above the major ferromagnetic surface of the ferromagnetic target object.

25. The method of claim 23, wherein at least one of the plurality of features comprises a notch removed from the major ferromagnetic surface of the ferromagnetic target object.

26. The method of claim 23, wherein at least one of the plurality of features comprises a first radius of a curve of at least a first section of the ferromagnetic target about an axis.

27. The method of claim 26, wherein at least one of the plurality of features comprises a second radius of a curve of at least a second section of the ferromagnetic target about an axis.

28. The method of claim 23, wherein at least one of the plurality of features comprises a depression into the major ferromagnetic surface of the ferromagnetic target object.

29. The method of claim 23, further comprising:
selecting the plurality of features to magnetically interact in different ways with each of the plurality of magnetic field sensing elements when the gear shift lever is in each position.

30. The method of claim 23, wherein the magnetic field sensor has different relative distances to the plurality of features when the gear shift lever is moved to positions associated with different respective gears.

31. The method of claim 22, wherein the selecting, by the magnetic field sensor, the set comprises:
selecting, by the magnetic field sensor, the two magnetic field sensing elements by weighting each generated electronic signal by a respective weight coefficient, each respective weight coefficient based upon the relative distance between each of the plurality of magnetic field sensing elements and the target object.

32. The method of claim 22, further comprising:
determining, by the magnetic field sensor, the position of the gear shift lever by comparing the difference of amplitudes between the electronic signals generated by each of the selected set of the plurality of magnetic field sensing elements to one or more threshold levels.

33. The method of claim 32, wherein the detecting comprises:
detecting, by the magnetic field sensor, at least three positions of the gear shift lever.

34. The method of claim 33, further comprising:
if the difference of amplitudes reaches a first threshold level, determining that the gear shift lever is in a first position;
if the difference of amplitudes reaches a second threshold level but does not reach the first threshold level, determining that the gear shift lever is in a second position; and
if the difference of amplitudes does not reach the second threshold level, determining that the gear shift lever is in a third position.

35. The method of claim 34, wherein the second position corresponds to a neutral position.

36. The method of claim 22, wherein the magnetic field sensor comprises:
an electronic circuit coupled to receive the sensed magnetic fields, the method further comprising:
generating, by the electronic circuit, an output signal indicative of the position of the gear shift lever.

37. The method of claim 22, wherein the plurality of magnetic field sensing elements comprises at least one of: a plurality of planar Hall elements, a plurality of vertical Hall elements, a plurality of fluxgate elements, or a plurality of magnetoresistance elements.

* * * * *

UNITED STATES PATENT AND TRADEMARK OFFICE
CERTIFICATE OF CORRECTION

PATENT NO. : 10,385,964 B2
APPLICATION NO. : 15/176524
DATED : August 20, 2019
INVENTOR(S) : Yannick Vuillermet et al.

Page 1 of 1

It is certified that error appears in the above-identified patent and that said Letters Patent is hereby corrected as shown below:

In the Specification

Column 2, Line 7 delete "magnets," and replace with --magnets--.

Column 7, Line 59 delete "FIGS. 2" and replace with --FIG. 2--.

Column 7, Line 60 delete "FIGS. 7" and replace with --FIG. 7--.

Column 7, Line 60 delete "FIGS. 8" and replace with --FIG. 8--.

Column 13, Line 25 delete "to others" and replace with --to other--.

In the Claims

Column 17, Line 45 delete "the at" and replace with --the--.

Column 18, Line 13 delete "the field magnetic" and replace with --the magnetic--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*